(12) United States Patent  
Luke et al.

(10) Patent No.: US 8,901,861 B2  
(45) Date of Patent: Dec. 2, 2014

(54) THERMAL MANAGEMENT OF COMPONENTS IN ELECTRIC MOTOR DRIVE VEHICLES

(75) Inventors: Hok-Sum Horace Luke, Mercer Island, WA (US); Matthew Whiting Taylor, North Bend, WA (US)

(73) Assignee: Gogoro, Inc., Guishan Township (TW)

( * ) Notice: Subject to any disclaimer, the term of this patent is extended or adjusted under 35 U.S.C. 154(b) by 188 days.

(21) Appl. No.: 13/559,259

(22) Filed: Jul. 26, 2012

(65) Prior Publication Data

US 2013/0033203 A1 Feb. 7, 2013

Related U.S. Application Data

(60) Provisional application No. 61/511,900, filed on Jul. 26, 2011, provisional application No. 61/647,936, filed on May 16, 2012, provisional application No. 61/534,753, filed on Sep. 14, 2011, provisional application No. 61/534,761, filed on Sep. 14, 2011, provisional application No. 61/534,772, filed on Sep. 14, 2011, provisional application No. 61/511,887, filed on Jul. 26, 2011, provisional application No. 61/647,941, filed on May 16, 2012, provisional application No. 61/511,880, filed on Jul. 26, 2011, provisional application No. 61/557,170, filed on Nov. 8, 2011, provisional application No. 61/581,566, filed on Dec. 29, 2011, provisional application No. 61/601,404, filed on Feb. 21, 2012, provisional application No. 61/601,949, filed on Feb. 22, 2012, provisional application No. 61/601,953, filed on Feb. 22, 2012.

(51) Int. Cl.  
*H02P 3/14* (2006.01)

(52) U.S. Cl.  
USPC .............................. 318/376; 318/139; 318/370

(58) Field of Classification Search  
USPC ....................... 318/376, 370, 139; 180/65.29; 123/142.5 E; 320/107, 150  
See application file for complete search history.

(56) References Cited

U.S. PATENT DOCUMENTS 4,087,895 A 5/1978 Etienne  
4,216,839 A 8/1980 Gould et al.  
(Continued)

FOREIGN PATENT DOCUMENTS

EP 2 230 146 A2 9/2010  
JP 07-031008 A 1/1995  
(Continued)

OTHER PUBLICATIONS

"Inrunner," retreived from URL=http://en.wikipedia.org/w/index.php?title=Inrunner&printable-yes on Sep. 28, 2011, 1 page.

(Continued)

*Primary Examiner* — Paul Ip  
(74) *Attorney, Agent, or Firm* — Seed IP Law Group PLLC

(57) ABSTRACT

Thermal management of various components such as electrical energy storage devices (e.g., batteries, super- or ultracapacitors), power converters and/or control circuits, in electrically powered vehicles may employ active temperature adjustment devices (e.g., Peltier devices), which may advantageously be powered using electrical energy generated by the traction electric motor during regenerative braking operation. Temperature adjustment may include cooling or heating one or more components. The adjustment may be based on a variety of factors or conditions, for instance sensed temperature, sensed current draw, sensed voltage, sensed rotational speed.

30 Claims, 7 Drawing Sheets

(56) References Cited

U.S. PATENT DOCUMENTS

| | | | |
|---|---|---|---|
| 5,187,423 A | 2/1993 | Marton | |
| 5,189,325 A | 2/1993 | Jarczynski | |
| 5,236,069 A | 8/1993 | Peng | |
| 5,627,752 A | 5/1997 | Buck et al. | |
| 5,839,800 A * | 11/1998 | Koga et al. | 303/152 |
| 5,898,282 A * | 4/1999 | Drozdz et al. | 318/139 |
| 5,998,963 A | 12/1999 | Aarseth | |
| 6,016,882 A | 1/2000 | Ishikawa | |
| 6,177,879 B1 | 1/2001 | Kokubu et al. | |
| 6,403,251 B1 | 6/2002 | Baggaley et al. | |
| 6,515,580 B1 | 2/2003 | Isoda et al. | |
| 6,583,592 B2 | 6/2003 | Omata et al. | |
| 7,426,910 B2 * | 9/2008 | Elwart | 123/46 E |
| 7,567,166 B2 | 7/2009 | Bourgine De Meder | |
| 7,898,439 B2 | 3/2011 | Bettez et al. | |
| 7,948,207 B2 | 5/2011 | Scheucher | |
| 7,979,147 B1 | 7/2011 | Dunn | |
| 7,993,155 B2 | 8/2011 | Heichal et al. | |
| 8,006,793 B2 | 8/2011 | Heichal et al. | |
| 8,006,973 B2 | 8/2011 | Toba et al. | |
| 8,013,571 B2 | 9/2011 | Agassi et al. | |
| 8,035,341 B2 | 10/2011 | Genzel et al. | |
| 8,035,349 B2 * | 10/2011 | Lubawy | 320/150 |
| 8,118,132 B2 | 2/2012 | Gray, Jr. | |
| 8,164,300 B2 | 4/2012 | Agassi et al. | |
| 8,265,816 B1 | 9/2012 | LaFrance | |
| 8,354,768 B2 | 1/2013 | Cipriani | |
| 8,378,627 B2 | 2/2013 | Asada et al. | |
| 8,614,565 B2 * | 12/2013 | Lubawy | 320/150 |
| 2003/0209375 A1 | 11/2003 | Suzuki et al. | |
| 2006/0284601 A1 | 12/2006 | Salasoo et al. | |
| 2008/0098972 A1 * | 5/2008 | Elwart | 123/142.5 E |
| 2009/0082957 A1 | 3/2009 | Agassi et al. | |
| 2009/0240575 A1 | 9/2009 | Bettez et al. | |
| 2009/0294188 A1 | 12/2009 | Cole | |
| 2010/0052588 A1 | 3/2010 | Okamura et al. | |
| 2010/0079115 A1 * | 4/2010 | Lubawy | 320/150 |
| 2010/0089547 A1 | 4/2010 | King et al. | |
| 2010/0094496 A1 | 4/2010 | Hershkovitz et al. | |
| 2010/0201482 A1 | 8/2010 | Robertson et al. | |
| 2011/0025267 A1 | 2/2011 | Kamen et al. | |
| 2011/0031929 A1 | 2/2011 | Asada et al. | |
| 2011/0071932 A1 | 3/2011 | Agassi et al. | |
| 2011/0112710 A1 | 5/2011 | Meyer-Ebeling et al. | |
| 2011/0114798 A1 | 5/2011 | Gemmati | |
| 2011/0148346 A1 | 6/2011 | Gagosz et al. | |
| 2011/0160992 A1 | 6/2011 | Crombez | |
| 2011/0202476 A1 | 8/2011 | Nagy et al. | |
| 2011/0260660 A1 * | 10/2011 | Lubawy | 318/376 |
| 2011/0270480 A1 | 11/2011 | Ishibashi et al. | |
| 2012/0062361 A1 | 3/2012 | Kosugi | |
| 2012/0068817 A1 | 3/2012 | Fisher | |
| 2012/0160580 A1 * | 6/2012 | Nakata | 180/65.29 |
| 2012/0259665 A1 | 10/2012 | Pandhi et al. | |
| 2012/0299537 A1 * | 11/2012 | Kikuchi | 320/107 |
| 2012/0316671 A1 | 12/2012 | Hammerslag et al. | |
| 2013/0026971 A1 | 1/2013 | Luke et al. | |
| 2013/0026972 A1 | 1/2013 | Luke et al. | |
| 2013/0026973 A1 | 1/2013 | Luke et al. | |
| 2013/0027183 A1 | 1/2013 | Wu et al. | |
| 2013/0030580 A1 | 1/2013 | Luke et al. | |
| 2013/0030581 A1 | 1/2013 | Luke et al. | |
| 2013/0030608 A1 | 1/2013 | Taylor et al. | |
| 2013/0030630 A1 | 1/2013 | Luke et al. | |
| 2013/0030696 A1 | 1/2013 | Wu et al. | |
| 2013/0030920 A1 | 1/2013 | Wu et al. | |
| 2013/0031318 A1 | 1/2013 | Chen et al. | |
| 2013/0090795 A1 | 4/2013 | Luke et al. | |
| 2013/0093271 A1 | 4/2013 | Luke et al. | |
| 2013/0093368 A1 | 4/2013 | Luke et al. | |
| 2013/0116892 A1 | 5/2013 | Wu et al. | |
| 2013/0127416 A1 | 5/2013 | Karner et al. | |
| 2013/0200845 A1 * | 8/2013 | Bito | 320/109 |

FOREIGN PATENT DOCUMENTS

| | | | |
|---|---|---|---|
| JP | 9-119839 A | 5/1997 | |
| JP | 10-307952 A | 11/1998 | |
| JP | 11-049079 | 2/1999 | |
| JP | 11-51681 A | 2/1999 | |
| JP | 11-176487 A | 7/1999 | |
| JP | 11-205914 A | 7/1999 | |
| JP | 2000-102102 A | 4/2000 | |
| JP | 2000-102103 A | 4/2000 | |
| JP | 2000-341868 A | 12/2000 | |
| JP | 2001-128301 | 5/2001 | |
| JP | 2003-118397 | 4/2003 | |
| JP | 2003-262525 A | 9/2003 | |
| JP | 2005-67453 A | 3/2005 | |
| JP | 2009-171646 A | 7/2009 | |
| JP | 2009-171647 A | 7/2009 | |
| JP | 4319289 B2 | 8/2009 | |
| JP | 2010-022148 A | 1/2010 | |
| JP | 2010-191636 A | 9/2010 | |
| JP | 2010-200405 A | 9/2010 | |
| JP | 2011-126452 | 6/2011 | |
| KR | 20100012401 A | 2/2010 | |
| KR | 10-0971278 B1 | 7/2010 | |
| KR | 20110004292 A | 1/2011 | |
| KR | 20110041783 A | 4/2011 | |
| TW | 200836452 A | 9/2008 | |
| TW | I315116 B | 9/2009 | |
| TW | M371880 U1 | 1/2010 | |
| TW | M379269 U1 | 4/2010 | |
| TW | M379789 U1 | 5/2010 | |
| TW | M385047 U1 | 7/2010 | |
| TW | 201043986 A1 | 12/2010 | |
| TW | 201044266 A1 | 12/2010 | |
| WO | 2010/033517 A2 | 3/2010 | |
| WO | 2010/143483 A1 | 12/2010 | |
| WO | 2012/160407 A1 | 11/2012 | |
| WO | 2012/160557 A2 | 11/2012 | |
| WO | 2013/024483 A2 | 2/2013 | |
| WO | 2013/024484 A1 | 2/2013 | |
| WO | 2013/080211 A1 | 6/2013 | |
| WO | 2013/102894 A1 | 7/2013 | |
| WO | 2013/108246 A2 | 7/2013 | |
| WO | 2013/118113 A2 | 8/2013 | |

OTHER PUBLICATIONS

"Outrunner," retreived from URL=http://en.wikipedia.org/w/index.php?title=Outrunner&printable=yes on Sep. 16, 2011, 2 pages.

Chen et al., "Apparatus, System, and Method for Authentication of Vehicular Components," U.S. Appl. No. 13/918,703, filed Jun. 14, 2013, 84 pages.

Chen et al., "Apparatus, Method and Article for Providing Vehicle Diagnostic Data," U.S. Appl. No. 61/601,404, filed Feb. 21, 2012, 56 pages.

International Search Report and Written Opinion for corresponding European Patent Application No. PCT/US2012/048349, mailed Feb. 18, 2013, 9 pages.

International Search Report and Written Opinion for corresponding European Patent Application No. PCT/US2012/048354, mailed Feb. 18, 2013, 11 pages.

International Search Report and Written Opinion for corresponding European Patent Application No. PCT/US2012/048358, mailed Feb. 25, 2013, 9 pages.

International Search Report and Written Opinion for corresponding European Patent Application No. PCT/US2012/048366, mailed Jan. 21, 2013, 10 pages.

International Search Report and Written Opinion for corresponding European Patent Application No. PCT/US2012/048367, mailed Jan. 17, 2013, 8 pages.

International Search Report and Written Opinion for corresponding European Patent Application No. PCT/US2012/048375, mailed Jan. 23, 2013, 9 pages.

International Search Report and Written Opinion for corresponding European Patent Application No. PCT/US2012/048379, mailed Dec. 17, 2012, 9 pages.

(56) References Cited

OTHER PUBLICATIONS

International Search Report and Written Opinion for corresponding International Application No. PCT/US2012/048391, mailed Dec. 21, 2012, 9 pages.
International Search Report and Written Opinion for corresponding International Patent Application No. PCT/US2012/048380, mailed Feb. 27, 2013, 9 pages.
International Search Report and Written Opinion for corresponding International Patent Application No. PCT/US2012/048382, mailed Feb. 27, 2013, 9 pages.
International Search Report and Written Opinion for corresponding European Patent Application No. PCT/US2012/063979, mailed Mar. 4, 2013, 10 pages.
International Search Report and Written Opinion for corresponding European Patent Application No. PCT/US2012/048344, mailed Feb. 28, 2013, 9 pages.
International Search Report and Written Opinion of the International Searching Authority for International Patent Application No. PCT/US2012/059931, dated Mar. 29, 2013, 13 pages.
Luke et al., "Apparatus, Method and Article for Authentication, Security and Control of Portable Charging Devices and Power Storage Devices, Such As Batteries," U.S. Appl. No. 14/017,090, filed Sep. 3, 2013, 69 pages.
Luke et al., "Apparatus, Method and Article for Authentication, Security and Control of Portable Charging Devices and Power Storage Devices, Such As Batteries," U.S. Appl. No. 61/773,621, filed Mar. 6, 2013, 69 pages.
Luke et al., "Apparatus, Method and Article for Providing Targeted Advertising in a Rechargeable Electrical Power Storage Device Distribution Environment," U.S. Appl. No. 61/773,614, filed Mar. 6, 2013, 77 pages.
Luke et al., "Detectible Indication of an Electric Motor Vehicle Standby Mode," U.S. Appl. No. 61/543,720, filed Oct. 5, 2011, 35 pages.
Luke et al., "Detectible Indication of an Electric Motor Vehicle Standby Mode," U.S. Appl. No. 61/684,432, filed Aug. 17, 2012, 41 pages.
Luke et al., "Electric Device Drive Assembly and Cooling System," U.S. Appl. No. 61/615,144, filed Mar. 23, 2012, 43 pages.
Luke et al., "Modular System for Collection and Distribution of Electric Storage Devices," U.S. Appl. No. 61/789,065, filed Mar. 15, 2013, 76 pages.
Luke et al., "Apparatus, Method and Article for Authentication, Security and Control of Power Storage Devices, Such As Batteries," U.S. Appl. No. 61/534,761, filed Sep. 14, 2011, 55 pages.
Luke et al., "Apparatus, Method and Article for Authentication, Security and Control of Power Storage Devices, Such As Batteries," U.S. Appl. No. 13/559,038, filed Jul. 26, 2012, 59 pages.
Luke et al., "Apparatus, Method and Article for Authentication, Security and Control of Power Storage Devices, Such As Batteries, Based on User Profiles," U.S. Appl. No. 61/534,772, filed Sep. 14, 2011, 55 pages.
Luke et al., "Apparatus, Method and Article for Authentication, Security and Control of Power Storage Devices, Such As Batteries, Based on User Profiles," U.S. Appl. No. 13/559,010, filed Jul. 26, 2012, 58 pages.
Luke et al., "Apparatus, Method and Article for Collection, Charging and Distributing Power Storage Devices, Such As Batteries," U.S. Appl. No. 61/511,900, filed Jul. 26, 2011, 73 pages.
Luke et al., "Apparatus, Method and Article for Collection, Charging and Distributing Power Storage Devices, Such As Batteries," U.S. Appl. No. 61/647,936, filed May 16, 2012, 76 pages.
Luke et al., "Apparatus, Method and Article for Collection, Charging and Distributing Power Storage Devices, Such As Batteries," U.S. Appl. No. 13/559,314, filed Jul. 26, 2012, 81 pages.
Luke et al., "Apparatus, Method and Article for Redistributing Power Storage Devices, Such As Batteries, Between Collection, Charging and Distribution Machines," U.S. Appl. No. 61/534,753, filed Sep. 14, 2011, 65 pages.
Luke et al., "Apparatus, Method and Article for Redistributing Power Storage Devices, Such As Batteries, Between Collection Charging and Distribution Machines," U.S. Appl. No. 13/559,091, filed Jul. 26, 2012, 69 pages.
Luke et al., "Apparatus, Method and Article for Reserving Power Storage Devices At Reserving Power Storage Device Collection, Charging and Distribution Machines," U.S. Appl. No. 13/559,064, filed Jul. 26, 2012, 72 pages.
Luke et al., "Detectible Indication of an Electric Motor Vehicle Standby Mode," U.S. Appl. No. 13/646,320, filed Oct. 5, 2012, 41 pages.
Luke et al., "Dynamically Limiting Vehicle Operation for Best Effort Economy," U.S. Appl. No. 61/511,880, filed Jul. 26, 2011, 52 pages.
Luke et al., "Dynamically Limiting Vehicle Operation for Best Effort Economy," U.S. Appl. No. 13/559,264, filed Jul. 26, 2012, 56 pages.
Luke et al., "Dynamically Limiting Vehicle Operation for Best Effort Economy," Office Action for U.S. Appl. No. 13/559,264, mailed Aug. 14, 2013, 21 pages.
Luke et al., "Electric Device Drive Assembly and Cooling System for Electric Device Drive," U.S. Appl. No. 13/650,395, filed Oct. 12, 2012, 62 pages.
Luke et al., "Electric Devices," U.S. Appl. No. 13/650,498, filed Oct. 12, 2012, 26 pages.
Luke et al., "Improved Drive Assembly for Electric Device," U.S. Appl. No. 13/650,392, filed Oct. 12, 2012, 43 pages.
Luke et al., "Thermal Management of Components in Electric Motor Drive Vehicles," U.S. Appl. No. 61/647,941, filed May 16, 2012, 47 pages.
Luke et al., "Thermal Management of Components in Electric Motor Drive Vehicles," U.S. Appl. No. 61/511,887, filed Jul. 26, 2011, 44 pages.
Luke et al., "Thermal Management of Components in Electric Motor Drive Vehicles," U.S. Appl. No. 13/559,259, filed Jul. 26, 2012, 51 pages.
Luke, "Apparatus, Method and Article for Changing Portable Electrical Power Storage Device Exchange Plans," U.S. Appl. No. 61/778,038, filed Mar. 12, 2013, 56 pages.
Luke, "Apparatus, Method and Article for Providing Information Regarding a Vehicle Via a Mobile Device," U.S. Appl. No. 14/017,081, filed Sep. 3, 2013, 81 pages.
Luke, "Apparatus, Method and Article for Providing Information Regarding a Vehicle Via a Mobile Device," U.S. Appl. No. 61/780,781, filed Mar. 13, 2013, 80 pages.
Microchip, "AN885: Brushless DC (BLDC) Motor Fundamentals," Microchip Technology Inc., 2003, 19 pages.
Taylor et al., "Apparatus, Method and Article for Physical Security of Power Storage Devices in Vehicles," U.S. Appl. No. 61/557,170, filed Nov. 8, 2011, 60 pages.
Taylor et al., "Apparatus, Method and Article for Physical Security of Power Storage Devices in Vehicles," U.S. Appl. No. 13/559,054, filed Jul. 26, 2012, 64 pages.
Taylor et al., "Apparatus, Method and Article for Physical Security of Power Storage Devices in Vehicles," Notice of Allowance for U.S. Appl. No. 13/559,054, mailed May 30, 2013, 32 pages.
Taylor et al., "Apparatus, Method and Article for Physical Security of Power Storage Devices in Vehicles," Office Action for U.S. Appl. No. 13/559,054, mailed Dec. 3, 2012, 11 pages.
Wu et al., "Apparatus, Method and Article for Security of Vehicles," U.S. Appl. No. 13/671,144, filed Nov. 7, 2012, 40 pages.
Wu et al., "Apparatus, Method and Article for a Power Storage Device Compartment," U.S. Appl. No. 61/581,566, filed Dec. 29, 2011, 61 pages.
Wu et al., "Apparatus, Method and Article for a Power Storage Device Compartment," U.S. Appl. No. 13/559,125, filed Jul. 26, 2012, 65 pages.
Wu et al., "Apparatus, Method and Article for Providing Information Regarding Availability of Power Storage Devices At a Power Storage Device Collection, Charging and Distribution Machine," U.S. Appl. No. 61/601,953, filed Feb. 22, 2012, 53 pages.

(56) References Cited

OTHER PUBLICATIONS

Wu et al., "Apparatus, Method and Article for Providing Information Regarding Availability of Power Storage Devices At a Power Storage Device Collection, Charging and Distribution Machine," U.S. Appl. No. 13/559,343, filed Jul. 26, 2012, 56 pages.

Wu et al., "Apparatus, Method and Article for Providing Locations of Power Storage Device Collection, Charging and Distribution Machines," U.S. Appl. No. 61/601,949, filed Feb. 22, 2012, 56 pages.

Wu et al., "Apparatus, Method and Article for Providing Locations of Power Storage Device Collection, Charging and Distribution Machines," U.S. Appl. No. 13/559,333, filed Jul. 26, 2012, 60 pages.

Wu et al., "Apparatus, Method and Article for Providing Locations of Power Storage Device Collection, Charging and Distribution Machines," Office Action for U.S. Appl. No. 13/559,333, mailed Jul. 3, 2013, 14 pages.

Wu et al., "Apparatus, Method and Article for Security of Vehicles," U.S. Appl. No. 61/557,176, filed Nov. 8, 2011, 37 pages.

* cited by examiner

```
                                                  ┌─ 700
                                                  ↙

┌──────────────────────────────────────┐
        │  Supply electrical power to temperature │─ 702
        │  adjustment device directly without any │
        │  intermediary electrical energy storage devices │
        └──────────────────────────────────────┘
```

┌──────────────────────────────────────────┐
        │  Receive signals indicative of sensed temperature from │─ 802
        │  temperature sensor(s) positioned to sense temperature at │
        │  least proximate main electrical energy storage device │
        └──────────────────────────────────────────┘
                           │
                           ▼
        ┌──────────────────────────────────────────┐
        │  Receive signals indicative of sensed electrical │─ 804
        │  characteristic(s) of main electrical energy storage device │
        │  from voltage or current sensor(s) coupled to sense electrical │
        │  characteristic(s) of main electrical energy storage device │
        └──────────────────────────────────────────┘
                           │
                           ▼
        ┌──────────────────────────────────────────┐
        │  Determine level of electrical power to deliver to │─ 806
        │  temperature adjustment device based at least in part on │
        │  sensed temperature(s) and/or sensed electrical │
        │  characteristic(s) of main electrical energy storage device │
        └──────────────────────────────────────────┘
```

*FIG. 8*

THERMAL MANAGEMENT OF COMPONENTS IN ELECTRIC MOTOR DRIVE VEHICLES

CROSS REFERENCE TO RELATED APPLICATIONS

This application claims the benefit under 35 U.S.C. 119(e) of the filing date of U.S. provisional patent application Ser. No. 61/511,900 entitled "APPARATUS, METHOD AND ARTICLE FOR COLLECTION, CHARGING AND DISTRIBUTING POWER STORAGE DEVICES, SUCH AS BATTERIES" and filed Jul. 26, 2011, U.S. provisional patent application Ser. No. 61/647,936 entitled "APPARATUS, METHOD AND ARTICLE FOR COLLECTION, CHARGING AND DISTRIBUTING POWER STORAGE DEVICES, SUCH AS BATTERIES" and filed May 16, 2012, U.S. provisional patent application Ser. No. 61/534,753 entitled "APPARATUS, METHOD AND ARTICLE FOR REDISTRIBUTING POWER STORAGE DEVICES, SUCH AS BATTERIES, BETWEEN COLLECTION, CHARGING AND DISTRIBUTION MACHINES" and filed Sep. 14, 2011, U.S. provisional patent application Ser. No. 61/534,761 entitled "APPARATUS, METHOD AND ARTICLE FOR AUTHENTICATION, SECURITY AND CONTROL OF POWER STORAGE DEVICES SUCH AS BATTERIES" and filed Sep. 14, 2011, U.S. provisional patent application Ser. No. 61/534,772 entitled "APPARATUS, METHOD AND ARTICLE FOR AUTHENTICATION, SECURITY AND CONTROL OF POWER STORAGE DEVICES, SUCH AS BATTERIES, BASED ON USER PROFILES" and filed Sep. 14, 2011, U.S. provisional patent application Ser. No. 61/511,887 entitled "THERMAL MANAGEMENT OF COMPONENTS IN ELECTRIC MOTOR DRIVE VEHICLES" and filed Jul. 26, 2011, U.S. provisional patent application Ser. No. 61/647,941 entitled "THERMAL MANAGEMENT OF COMPONENTS IN ELECTRIC MOTOR DRIVE VEHICLES" and filed May 16, 2012, U.S. provisional patent application Ser. No. 61/511,880 entitled "DYNAMICALLY LIMITING VEHICLE OPERATION FOR BEST EFFORT ECONOMY" and filed Jul. 26, 2011, U.S. provisional patent application Ser. No. 61/557,170 entitled "APPARATUS, METHOD, AND ARTICLE FOR PHYSICAL SECURITY OF POWER STORAGE DEVICES IN VEHICLES" and filed Nov. 8, 2011, U.S. provisional patent application Ser. No. 61/581,566 entitled "APPARATUS, METHOD AND ARTICLE FOR A POWER STORAGE DEVICE COMPARTMENT" and filed Dec. 29, 2011, U.S. provisional patent application Ser. No. 61/601,404 entitled "APPARATUS, METHOD AND ARTICLE FOR PROVIDING VEHICLE DIAGNOSTIC DATA" and filed Feb. 21, 2012, U.S. provisional patent application Ser. No. 61/601,949 entitled "APPARATUS, METHOD AND ARTICLE FOR PROVIDING LOCATIONS OF POWER STORAGE DEVICE COLLECTION, CHARGING AND DISTRIBUTION MACHINES" and filed Feb. 22, 2012, and U.S. provisional patent application Ser. No. 61/601,953 entitled "APPARATUS, METHOD AND ARTICLE FOR PROVIDING INFORMATION REGARDING AVAILABILITY OF POWER STORAGE DEVICES AT A POWER STORAGE DEVICE COLLECTION, CHARGING AND DISTRIBUTION MACHINE" and filed Feb. 22, 2012.

BACKGROUND

1. Technical Field

The present disclosure generally relates to vehicles which employ electric motors as the prime mover or traction motor and, in particular, thermal management of rechargeable electrical energy storage devices (e.g., secondary batteries, supercapacitors or ultracapacitors) and/or other components (e.g., power converters, control circuits) employed in such vehicles.

2. Description of the Related Art

Hybrid and all electrical vehicles are becoming increasing common. Such vehicles may achieve a number of advantages over traditional internal combustion engine vehicles. For example, hybrid or electrical vehicles may achieve higher fuel economy and may have little or even zero tail pipe pollution. In particular, all electric vehicles may not only have zero tail pipe pollution, but may be associated with lower overall pollution. For example, electrical power may be generated from renewable sources (e.g., solar, hydro). Also for example, electrical power may be generated at generation plants that produce no air pollution (e.g., nuclear plants). Also for example, electrical power may be generated at generation plants that burn relatively "clean burning" fuels (e.g., natural gas), which have higher efficiency than internal combustion engines, and/or which employ pollution control or removal systems (e.g., industrial air scrubbers) which are too large, costly or expensive for use with individual vehicles.

Personal transportation vehicles such as combustion engine powered scooters and/or motorbikes are ubiquitous in many places, for example in the many large cities of Asia. Such scooters and/or motorbikes tend to be relatively inexpensive, particular as compared to automobiles, cars or trucks. Cities with high numbers of combustion engine scooters and/or motorbikes also tend to be very densely populated and suffer from high levels of air pollution. When new, many combustion engine scooters and/or motorbikes are equipped as a relatively low polluting source of personal transportation. For instance, such scooters and/or motorbikes may have higher mileage ratings than larger vehicles.

Some scooters and/or motorbikes may even be equipped with basic pollution control equipment (e.g., catalytic converter). Unfortunately, factory specified levels of emission are quickly exceeded as the scooters and/or motorbikes are used and either not maintained and/or as the scooters and/or motorbikes are modified, for example by intentional or unintentional removal of catalytic converters. Often owners or operators of scooters and/or motorbikes lack the financial resources or the motivation to maintain their vehicles.

It is known that air pollution has a negative effect on human health, being associated with causing or exacerbating various diseases (e.g., numerous reports tie air pollution to emphysema, asthma, pneumonia, and cystic fibrosis, as well as various cardiovascular diseases). Such diseases take large numbers of lives and severely reduce the quality of life of countless others.

BRIEF SUMMARY

Zero tail pipe emission alternatives to combustion engines would greatly benefit the air quality, and hence health of large populations.

While the zero tail pipe emissions benefit of all-electric vehicles are appreciated, adoption of all-electric vehicles by large populations has been slow. One of the reasons appears to be related to performance, particularly performance of the main electrical power source, typically an array of secondary (i.e., rechargeable) chemical battery cells, commonly referred to as a battery. Another reason appears to be performance of the circuitry that couples the main electrical power source with the traction electrical motor, which drives the traction wheel(s). Such circuitry typically includes one or more power converters, for instance DC/DC power converters (e.g., step up, step down), DC/AC power converters commonly referred to as inverters, and/or AC/DC power converters commonly referred to as rectifiers. Performance of these components may be significantly affected by the temperature of the components and/or the ambient environment to which the components are exposed. For example, discharging and/or charging of a battery may be significantly affected by the temperature of the battery or its ambient environment. Likewise, operation of many components of a power converter, for instance transistors, capacitors, etc. may be significantly affected by temperature. Further, these components typically dissipate relatively large amounts of heat during operation.

The approaches described herein may address some of the issues which have limited adoption of zero tailpipe emission technology, particularly in densely crowded cities, and in populations with limited financial resources.

For example, some of the approaches described herein employ efficient systems and methods of handling thermal management of various components such as electrical energy storage devices (e.g., batteries, super- or ultracapacitors), power converters and/or control circuits, in electrically powered vehicles. Such may employ active temperature adjustment devices, for instance Peltier effect devices, which may advantageously be powered using electrical energy generated by the traction electric motor during regenerative braking operation. Temperature adjustment may include cooling or removal of heat from one or more components or from the ambient environment surrounding the component(s). Temperature adjustment may additionally, or alternatively, include heating or delivering heat to one or more components or to the ambient environment surrounding the component(s). The adjustment may be based on a variety of factors or conditions, for instance sensed temperature, sensed current draw, sensed voltage, and sensed rotational speed, to name a few.

A power system for a vehicle may be summarized as including a traction electric motor coupled to drive at least one traction wheel of the vehicle; a main electrical energy storage device to drive the traction electric motor; at least one temperature adjustment device positioned and operable to adjust a temperature at least proximate the main electrical energy storage device; and a control circuit that causes electrical power generated by the traction electric motor operated regeneratively in a braking mode to be supplied to the temperature adjustment device to adjust a temperature of the main electrical energy storage device.

The control circuit may further cause electrical power to be supplied to the traction electrical motor from the main electrical energy storage device in a drive mode. The main electrical energy storage device may include at least one secondary chemical battery cell. The at least one temperature adjustment device may include at least one Peltier effect device. The control circuit may cause electrical power generated by the traction electric motor to be supplied to the temperature adjustment device via the main electrical energy storage device.

The power system may further include an auxiliary electrical energy storage device, wherein the control circuit causes electrical power generated by the traction electric motor to be supplied to the temperature adjustment device via the auxiliary electrical energy storage device. The control circuit may cause electrical power generated by the traction electric motor to be supplied directly to the temperature adjustment device without any intermediary electrical energy storage devices. The control circuit may include at least one temperature sensor positioned to sense temperature at least proximate the main electrical energy storage device, and the control circuit may control the electrical power delivered to the at least one temperature adjustment device based at least in part on the sensed temperature. The control circuit may include at least one of a voltage sensor or a current sensor coupled to sense at least one electrical characteristic of the main electrical energy storage device, wherein the control circuit may control the electrical power delivered to the at least one temperature adjustment device based at least in part on the at least one sensed electrical characteristic of the main electrical energy storage device. The control circuit may include at least one of a voltage sensor or a current sensor coupled to sense at least one electrical characteristic of the traction electric motor, wherein the control circuit may control the electrical power delivered to the at least one temperature adjustment device based at least in part on the at least one sensed electrical characteristic of the traction electric motor. The control circuit may include a rotation sensor coupled to sense a rate of rotation of a drive shaft of the traction electric motor, wherein the control circuit may control the electrical power delivered to the at least one temperature adjustment device based at least in part on the sensed rate of rotation of the traction electric motor. The control circuit may include a temperature sensor positioned to sense a temperature at least proximate the traction electric motor, wherein the control circuit may control the electrical power delivered to the at least one temperature adjustment device based at least in part on the sensed temperate at least proximate the traction electric motor. The control circuit may include a rectifier coupled to rectify an alternating current (AC) produced by the traction electric motor when operating in the braking mode into a direct current (DC). The control circuit may include at least one DC/DC converter electrically coupled to the at least one temperature adjustment device and operable to change a voltage level of electrical power transferred between the at least one temperature adjustment device and at least one other component of the power system. The control circuit may includes at least one temperature sensor positioned to sense a temperature at least proximate at least one of the rectifier or the DC/DC converter, wherein the control circuit may control the electrical power delivered to the at least one temperature adjustment device based at least in part on the sensed temperate at least proximate at least one of the rectifier or the DC/DC converter. A first one of the at least one temperature adjustment devices may be positioned and operable to adjust a temperature at least proximate one of the rectifier, the DC/DC converter, or the control circuit.

The power system may further include a thermal dissipation resistor selectively electrically coupled to dissipate as heat, electrical energy generated by the traction electric motor in response to the generated electrical energy approaching a rated power of the at least one temperature adjustment device.

A method of operating a power system for a vehicle having a traction electric motor may be summarized as including supplying electrical power from a main electrical energy storage device to the traction electrical motor of the vehicle in a drive mode; generating electrical power by the traction electric motor that operates regeneratively in a braking mode; supplying electrical power generated by the traction electric motor to a temperature adjustment device; and adjusting a temperature of at least the main electrical energy storage device by the temperature adjustment device in response to the supply of power thereto. Supplying electrical power from a main electrical energy storage device to the traction electrical motor may include supplying electrical power from at least one secondary chemical battery cell. Supplying electrical power generated by the traction electric motor to a temperature adjustment device may include supplying electrical power to at least one Peltier effect device. Supplying electrical power generated by the traction electric motor to a temperature adjustment device may include supplying the electrical power via the main electrical energy storage device. Supplying electrical power generated by the traction electric motor to a temperature adjustment device may include supplying the electrical power via an auxiliary electrical energy storage device, different from the main electrical energy storage device which supplies power to the traction electric motor. Supplying electrical power generated by the traction electric motor to a temperature adjustment device may include supplying the electrical power directly to the temperature adjustment device without any intermediary electrical energy storage devices.

The method may further include receiving signals indicative of sensed temperature from at least one temperature sensor positioned to sense temperature at least proximate the main electrical energy storage device, and wherein the supplying electrical power to the at least one temperature adjustment device is based at least in part on the sensed temperature.

The method may further include receiving signals indicative of at least one sensed electrical characteristic of the main electrical energy storage device from at least one of a voltage sensor or a current sensor coupled to sense at least one electrical characteristic of the main electrical energy storage device, and wherein supplying electrical power to the at least one temperature adjustment device is based at least in part on the at least one sensed electrical characteristic of the main electrical energy storage device.

The method may further include receiving signals indicative of at least one sensed electrical characteristic of the traction electric motor from at least one of a voltage sensor or a current sensor coupled to sense at least one electrical characteristic of the traction electric motor, and wherein supplying electrical power to the at least one temperature adjustment device is based at least in part on the at least one sensed electrical characteristic of the traction electric motor.

The method may further include receiving signals indicative of a sensed rate of rotation of the traction electric motor from a rotation sensor coupled to sense a rate of rotation of a drive shaft of the traction electric motor, and wherein supplying electrical power to the at least one temperature adjustment device is based at least in part on the sensed rate of rotation of the traction electric motor.

The method may further include receiving signals indicative of a sensed temperate at least proximate the traction electric motor from a temperature sensor positioned to sense a temperature at least proximate the traction electric motor, and wherein supplying electrical power to the at least one temperature adjustment device is based at least in part on the sensed temperate at least proximate the traction electric motor.

The method may further include receiving signals indicative of a sensed temperate at least proximate a power convert, and wherein supplying electrical power to the at least one temperature adjustment device is based at least in part on the sensed temperate at least proximate the power converter to cool the power converter.

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale. For example, the shapes of various elements and angles are not drawn to scale, and some of these elements are arbitrarily enlarged and positioned to improve drawing legibility. Further, the particular shapes of the elements as drawn, are not intended to convey any information regarding the actual shape of the particular elements, and have been solely selected for ease of recognition in the drawings.

FIG. 7 is a flow diagram showing a low level method of operating the components or structures of FIGS. 2 and 3 to implement thermal management according to one non-limiting illustrated embodiment, including supplying power to a temperature adjustment device directly from a traction electric motor without the use of intervening electrical energy storage devices, useful in performing the method of FIG. 4.

FIG. 8 is a flow diagram showing a low level method of operating the components or structures of FIGS. 2 and 3 to implement thermal management according to one non-limiting illustrated embodiment, including receiving signals indicative of operational characteristics of the main electrical energy storage device and controlling a temperature adjustment device based at least in part of the received signals, useful in performing the method of FIG. 4.

DETAILED DESCRIPTION

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures associated with vending apparatus, batteries, super- or ultracapacitors, power converters including but not limited to transformers, rectifiers, DC/DC power converters, switch mode power converters, controllers, and communications systems and structures and networks have not been shown or described in detail to avoid unnecessarily obscuring descriptions of the embodiments.

Unless the context requires otherwise, throughout the specification and claims which follow, the word "comprise" and variations thereof, such as, "comprises" and "comprising" are to be construed in an open, inclusive sense that is as "including, but not limited to."

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment.

The use of ordinals such as first, second and third does not necessarily imply a ranked sense of order, but rather may only distinguish between multiple instances of an act or structure.

Reference to portable electrical power storage device or electrical energy storage device means any device capable of storing electrical power and releasing stored electrical power including but not limited to batteries, super- or ultracapacitors. Reference to batteries means chemical storage cell or cells, for instance rechargeable or secondary battery cells including but not limited to nickel cadmium alloy or lithium ion battery cells.

The headings and Abstract of the Disclosure provided herein are for convenience only and do not interpret the scope or meaning of the embodiments.

Figure 1:
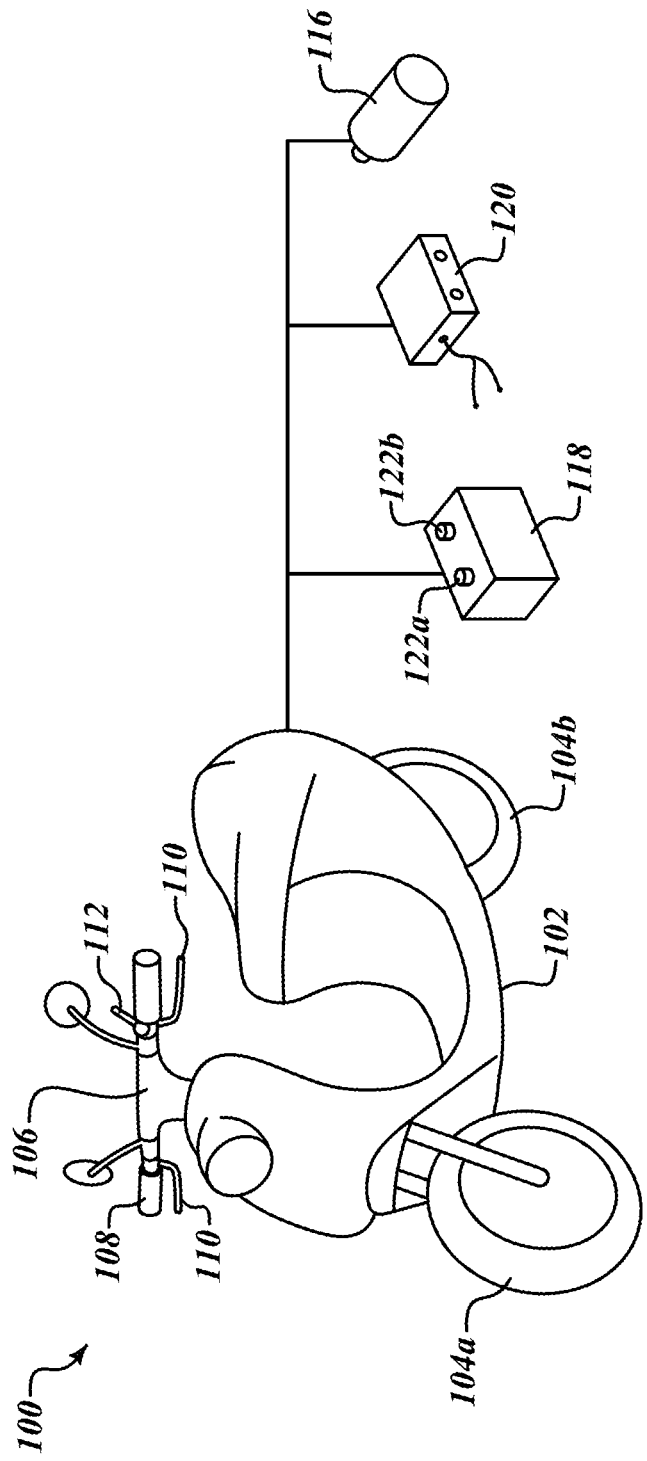
FIG. 1 is an isometric, partially exploded, view of an electric scooter or motorbike which may include the various components or structures described herein, according to one non-limiting illustrated embodiment.

FIG. 1 shows an electrically powered personnel transportation vehicle in the form of an electric scooter or motorbike 100, according to one illustrated embodiment.

As previously noted, combustion engine scooters and motorbikes are common in many large cities, for example in Asia, Europe and the Middle East. The ability to address performance or efficiency issues related to the use of electrical power storage devices (e.g., secondary batteries) as the main or primary source of power for a vehicle may foster the use of all-electric scooters and motorbikes 108 in place of internal combustion engine scooters and motorbikes, thereby alleviating air pollution, as well as reducing noise.

The electric scooter or motorbike 100 includes a frame 102, wheels 104a, 104b (collectively 104), and handle bar 106 with user controls such as throttle 108, brake levers 110, turn indicators switches 112, etc., all of which may be of conventional design. The electric scooter or motorbike 100 may also include a power system 114, which includes a traction electric motor 116 coupled to drive at least one of the wheels 104b, at least one main electrical power storage device 118 that stores electrical power to power at least the traction electric motor 116, and control circuit 120 which controls power distribution between at least the main electrical power storage device 118 and the traction electric motor 116.

The traction electric motor 116 may take any of a variety of forms, but typically will be a permanent magnet induction motor capable of producing sufficient power (Watts or horsepower) and torque to drive the expected load at desirable speeds and acceleration. The traction electric motor 116 may be any conventional electric motor capable of operating in a drive mode, as well as operating in a regenerative braking mode. In the drive mode, the traction electric motor consumes electrical power, to drive the wheel. In the regenerative braking mode, the traction electric motor operates as a generator, producing electric current in response to rotation of the wheel and producing a braking effect to slow a vehicle.

The main electrical energy storage devices 118 may take a variety of forms, for example batteries (e.g., array of battery cells) or super- or ultracapacitors (e.g., array of ultracapacitor cells). For example, the electrical energy storage devices 118 may take the form of rechargeable batteries (i.e., secondary cells or batteries). The electrical energy storage devices 118 may, for instance, be sized to physically fit, and electrically power, personal transportation vehicles, such as all-electric scooters or motorbikes 100, and may be portable to allow easy replacement or exchange. Given the likely demand imposed by the transportation application, main electrical energy storage devices 118 are likely to take the form of one or more chemical battery cells.

The electrical energy storage devices 118 may include a number of electrical terminals 122a, 122b (two illustrated, collectively 122), accessible from an exterior of the electrical energy storage device 118. The electrical terminals 122 allow charge to be delivered from the electrical energy storage device 118, as well as allowing charge to be delivered to the electrical energy storage device 118 for charging or recharging the same. While illustrated in FIG. 1 as posts, the electrical terminals 122 may take any other form which is accessible from an exterior of the electrical energy storage device 118, including electrical terminals positioned within slots in a battery housing.

As better illustrated and described below, the control circuit 120 includes various components for transforming, conditioning and controlling the transfer of electrical power, particularly between the electrical energy storage device 118 and the traction electric motor 116.

Figure 2:
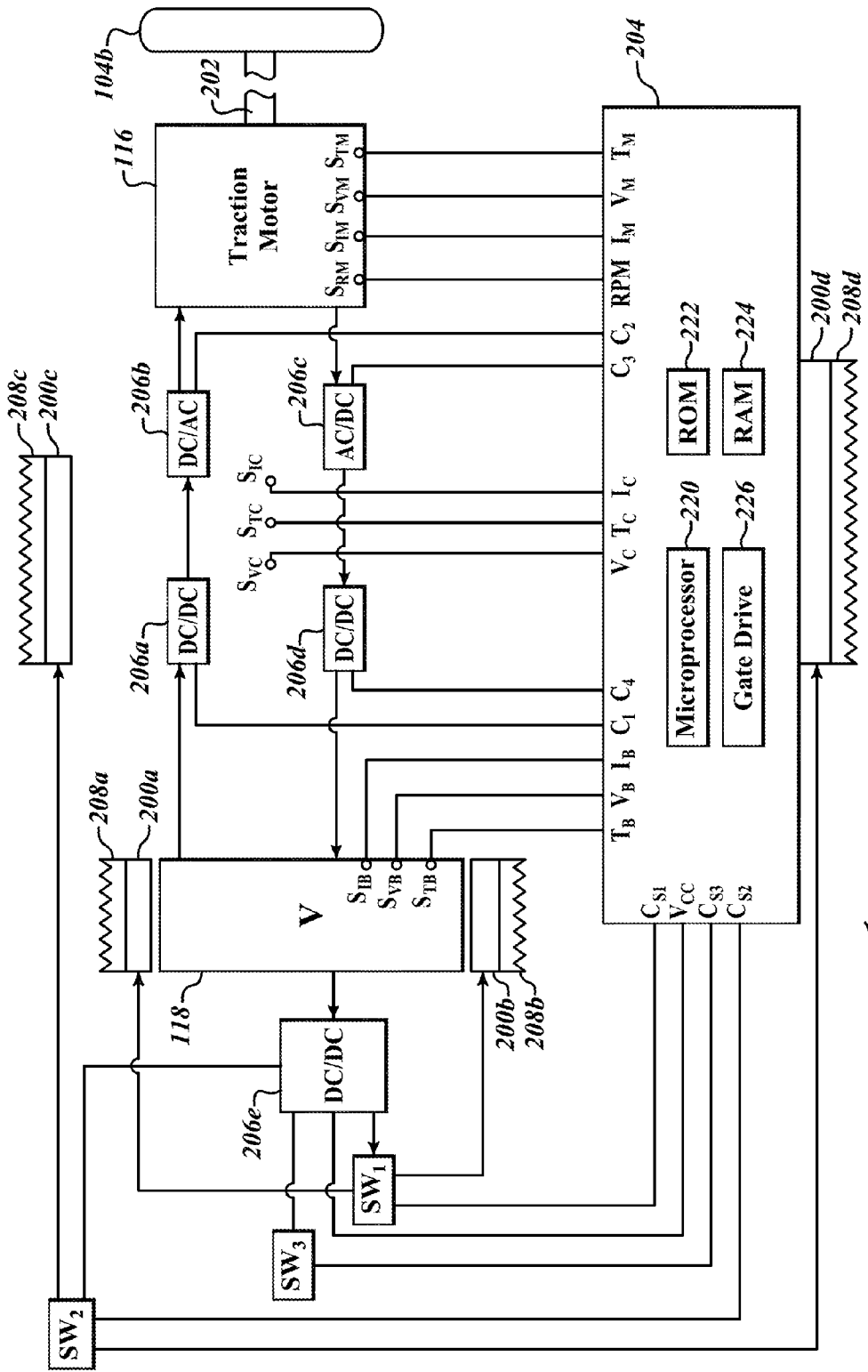
FIG. 2 is a block diagram of some of the components or structures of the scooter or motorbike of FIG. 1, according to one non-limiting illustrated embodiment.

FIG. 2 shows the portions of the electric scooter or motorbike 100, according to one illustrated embodiment. In particular, FIG. 2 shows an embodiment which employs the electrical energy storage device 118 to supply power generated by the traction electric motor 116 to be used for adjusting or controlling the temperature of various components (e.g., electrical energy storage device 118 and/or circuitry) via a number of temperature adjustment devices, collectively 200.

As illustrated, the traction electric motor 116 includes a shaft 202, which is coupled either directly or indirectly to drive at least one wheel 104b of the electric scooter or motorbike 100. While not illustrated, a transmission (e.g., chain, gears, universal joint) may be employed.

The control circuit 120 may take any of a large variety of forms, and will typically include a controller 204, one or more power converters 206a-206e (five illustrated), switches $SW_1$-$SW_3$ (three illustrated) and/or sensors $S_{TB}$, $S_{VB}$, $S_{IB}$, $S_{TC}$, $S_{VC}$, $S_{IC}$, $S_{TM}$, $S_{VM}$, $S_{IM}$, $S_{RM}$.

As illustrated in FIG. 2, the control circuit 120 may include a first DC/DC power converter 206a that, in a drive mode or configuration, couples the electrical energy storage device 118 to supply power generated by the traction electric motor 116. The first DC/DC power converter 206a may step up a voltage of electrical power from the electrical energy storage device 118 to a level sufficient to drive the traction electric motor 116. The first DC/DC power converter 206a may take a variety of forms, for example an unregulated or regulated switch mode power converter, which may or may not be isolated. For instance, the first DC/DC power converter 206a may take the form of a regulated boost switch mode power converter or buck-boost switch mode power converter.

The control circuit 120 may include a DC/AC power converter 206b, commonly referred to as an inverter that in the drive mode or configuration, couples the electrical energy storage device 118 to supply power generated by the traction electric motor 116 via the first DC/DC converter 206*a*. The DC/AC power converter 206*b* may invert electrical power from the first DC/DC converter 206*a* into an AC waveform suitable to drive the traction electric motor 116. The AC wave form may be single phase or multi-phase, for example two or three phase AC power. The DC/AC power converter 206*b* may take a variety of forms, for example an unregulated or regulated switch mode power converter, which may or may not be isolated. For instance, the DC/AC power converter 206*b* may take the form of a regulated inverter.

The first DC/DC power converter 206*a* and the DC/AC power converter 206*b* are controlled via control signals $C_1$, $C_2$, respectively, supplied via the controller 204. For example, the controller 204, or some intermediary gate drive circuitry, may supply pulse width modulated gate drive signals to control operation of switches (e.g., metal oxide semiconductor field effect transistors or MOSFETs, bipolar insulated gate transistors or IGBTs) of the first DC/DC and/or DC/AC power converters 206*a*, 206*b*.

As further illustrated in FIG. 2, the control circuit 120 may include an AC/DC power converter 206*c*, commonly referred to as a rectifier that in a braking or regenerative braking mode or configuration, couples the traction electric motor 116 to supply power generated thereby to the electrical energy storage device 118. The AC/DC power converter 206*c* may rectify an AC waveform from produced by the traction electric motor 116 to a DC form suitable for supplying the electrical energy storage device 118 and, optionally, other components such as the control circuit 120. The AC/DC power converter 206*c* may take a variety of forms, for example a full bridge passive diode rectifier or full bridge active transistor rectifier.

The control circuit 120 may also include a second DC/DC power converter 206*d* that electrically couples the traction electric motor 116 to the electrical energy storage device 118 via the AC/DC power converter 206*c*. The second DC/DC power converter 206*d* may step down a voltage or further filter the waveform of the rectified AC electrical power generated by the traction electric motor 116 to a level suitable for the electrical energy storage device 118. The second DC/DC power converter 206*d* may take a variety of forms, for example an unregulated or regulated switch mode power converter, which may or may not be isolated. For instance, the second DC/DC power converter 206*d* may take the form of a regulated buck switch mode power converter, synchronous buck switch mode power converter, or buck-boost switch mode power converter.

The AC/DC power converter 206*c* and the second DC/DC power converter 206*d* are controlled via control signals $C_3$, $C_4$, respectively, and supplied via the controller 204. For example, the controller 204, or some intermediary gate drive controller, may supply pulse width modulated gate drive signals to control operation of switches (e.g., MOSFETs, IGBTs) of the AC/DC and/or the second DC/DC power converters 206*c*, 206*d*.

As further illustrated in FIG. 2, the control circuit 120 may include a third DC/DC power converter 206*e* that electrically couples the electrical energy storage device 118 to various other components, for example the controller 120. The third DC/DC power converter 206*e* may step down a voltage of the electrical power supplied by the electrical energy storage device 118 to a level suitable for one or more other components. The third DC/DC power converter 206*e* may take a variety of forms, for example an unregulated or regulated switch mode power converter, which may or may not be isolated. For instance, the third DC/DC power converter 206*e* may take the form of a regulated buck switch mode power converter, synchronous buck switch mode power converter, or buck-boost switch mode power converter.

The one or more of the DC/DC converters 206*a*, 206*d*, and 206*e* can include one or more buck converters, boost converters, buck-boost converters, or any combination thereof. In some situations, one or more of the DC converters 206*a*, 206*d*, and 206*e*, may include a buck converter. A buck converter can include any switched device suitable for reducing an input DC voltage a lower output DC voltage. Typical buck converters include a switching device, for example a pulse wave modulated MOSFET or IGBT that controls the input voltage delivered to an inductor coupled in series and a diode and a capacitor coupled in parallel with the load. In some instances, the DC-DC buck converter may include a synchronous buck converter using one or more switching devices in lieu of the diode found in a conventional buck converter. The use of one or more switching devices such as a second MOSFET or IGBT transistor or transistor array in a synchronous buck converter may advantageously reduce power loss attributable to the diode forward voltage drop that occurs within a standard buck converter. In some situations, at least a portion of the one or more DC converters 206*a*, 206*d*, and 206*e* may include a boost converter. A boost converter can include any device or system suitable for increasing a relatively low input DC voltage to a higher DC output voltage. Such converters may be useful, for example in reducing the number of cells in the main traction battery needed to power the traction motor. For example, a DC boost converter may be used to provide 48 VDC power to a traction motor in an electric scooter using 12 VDC or 24 VDC batteries as a power source. Typical boost converters include a switching device, for example a pulse wave modulated MOSFET or IGBT that alternatively permits the an electric field to build about an inductor in series with the source, then places the inductor and the source in series with a load to deliver power to the load at a voltage greater than the source voltage.

In some situations, at least a portion of the one or more DC converters 206*a*, 206*d*, and 206*e* may include a buck-boost converter. A buck-boost converter can include any number of systems or devices suitable for either increasing or decreasing an input voltage to provide either a higher or lower output voltage to one or more loads. Buck-boost converters may be useful, for example in adjusting the voltage output to the Peltier coolers and/or the ultracapacitor provided during regenerative braking events when the input voltage provided to the buck-boost converter may vary with external factors such as braking force and speed. Buck-boost converters can include a switching device, for example a pulse wave modulated MOSFET or IGBT that alternatively permits the an electric field to build about an inductor in series with the source and a capacitor in series with the load, then places the inductor and the capacitor in series with the load to deliver a power at a voltage that can be greater or less than the source voltage, dependent upon the demand placed on the converter by the load.

The one or more of the AC/DC converters 206*b*, 206*c* can include one or more active rectifiers, one or more passive rectifiers, or any combination thereof. In some situations, at least a portion of the one or more AC/DC converters 206*b*, 206*c* may include a passive rectifier, for example a full-wave bridge or Schottky rectifier comprising a plurality of passive devices such as diodes. Such passive rectifiers can include half-wave or full-wave rectifiers. Passive rectifiers are useful in converting at least a portion of the direct current supplied by the electrical energy storage device 118 to the traction motor 116 (e.g. DC/AC converter 206*b*). Passive rectifiers are also useful in converting at least a portion of the alternating current generated by the traction motor 116 during regenerative braking events to direct current for supply to the electrical energy storage device 118, the ultracapacitor, or the Peltier coolers 200 (e.g., AC/DC converter 206c).

In some situations, at least a portion of the one or more AC/DC converters 206b, 206c may include an active or synchronous rectifier comprising a plurality of active switching devices such as MOSFETs or the like that are used in lieu of the diode array found in a passive rectifier. Such active rectifiers can include half-wave or full-wave rectifiers, and advantageously reduce the power loss encountered in passive rectifiers due to the voltage attributable to the diodes used in passive rectifiers. Active rectifiers are useful in converting at least a portion of the direct current supplied by the electrical energy storage device 118 to the traction motor 116 (e.g. DC/AC converter 206b). Active rectifiers are also useful in converting at least a portion of the alternating current generated by the traction motor 116 during regenerative braking events to direct current for supply to the electrical energy storage device 118, the ultracapacitor, or the Peltier coolers 200 (e.g., AC/DC converter 206c).

As also illustrated in FIG. 2, the temperature adjustment device(s) 200 may be located to control or adjust temperature of or proximate certain components.

The temperature adjustment device(s) 200 may be located proximate, adjacent to or in contact with one or more other components which would benefit by having active temperature management or handling. For example, a first number of temperature adjustment devices 200a, 200b (two illustrated) may be located proximate, adjacent to or in contact with the main electrical energy storage device 118, which supplies electrical power to the traction electric motor 116. A second number of temperature adjustment devices 200c may be located proximate, adjacent to or in contact with one or more components or elements of the control circuit, for example one or more of the power converters 206a-206e. A third number of temperature adjustment devices 200d may be located proximate, adjacent to or in contact with one or more components of the controller 204. While illustrated proximate the first DC/DC power converter 206a and DC/AC power converter 206b, the temperature adjustment device 200c may additionally, or alternatively, be located proximate, adjacent to or in contact with the AC/DC power converter 206c or second DC/DC power converter 206d. Additionally or alternatively, one or more temperature adjustment devices 200 may be located proximate the third DC/DC power converter 206e. The temperature adjustment devices 200 may be powered from power generated by the traction electric motor 116, which power is generated thereby during a regenerative braking operation. One or more switches $SW_1$ (only one illustrated) may be operated in response to control signals CS1 from the controller 120 to selectively couple power to the temperature adjustment devices from the electrical energy storage device 118.

The temperature adjustment devices 200 may take a variety of forms. For example, one or more of the temperature adjustment devices 200 may take the form of Peltier devices, also known as Peltier effect devices. Such devices employ the Peltier effect to create a heat flux between a junction of two different types of materials. The Peltier device is a solid state active heat pump, which in response to a direct current transfers heat against a temperature gradient from one side to the other side of the device. The direction of heat transfer is controlled by the polarity of the applied DC voltage. Hence, such devices are sometimes referred to as Peltier cooler, Peltier heater or thermoelectric heat pump. One or more of the temperature adjustment devices 200 may, for example, take the form of a resistive heater.

One or more of the temperature adjustment devices 200 may include, or be thermally conductively coupled with, one or more heat exchange devices 208a-208d (collectively 208). The heat exchange devices 208 may include heat sinks (i.e., a device transfers heat from a solid material to a fluid such as air), heat spreaders (i.e., plate with relatively high thermal conductivity) and/or or heat pipes (i.e., heat transfer device employing phase transition of a material), alone or in any combination. The heat exchange devices 208 will typically have a relatively large heat dissipation surface area as compared to the temperature adjustment devices 200. For example, the heat exchange devices 208 may include a plurality of fins, for example pin fins to maximize surface area for a given volume. The heat dissipation surfaces of the heat exchange devices 208 may be positioned relatively away from the specific components which are being cooled.

The controller 204 may take a variety of forms which may include one or more integrated circuits, integrated circuit components, analog circuits or analog circuit components. As illustrated, the controller 204 includes a microcontroller 220, non-transitory computer- or processor readable memory such as a read only memory (ROM) 222 and/or random access memory (RAM) 224, and may optionally include one or more gate drive circuits 226.

The microcontroller 220 executes logic to control operation of the power system, and may take a variety of forms. For example, the microcontroller 220 may take the form of a microprocessor, programmed logic controller (PLC), programmable gate array (PGA) such as a field programmable gate array (FPGS), and application specific integrated circuit (ASIC), or other such microcontroller device. The ROM 222 may take any variety of forms capable of storing processor executable instructions and/or data to implement the control logic. The RAM 224 may take any variety of forms capable of temporarily retaining processor executable instructions or data. The microcontroller 220, ROM 222, RAM 224 and optional gate drive circuit(s) 226 may be coupled by one or more buses (not shown), including power buses, instructions buses, data buses, address buses, etc. Alternatively, the control logic may be implemented in an analog circuit.

The gate drive circuit(s) 226 may take any of a variety of forms suitable for driving switches (e.g., MOSFETs, IGBTs) of the power converters 206 via drive signals (e.g., PWM gate drive signals). While illustrated as part of the controller 204, one or more gate drive circuits may be intermediate the controller 204 and the power converters 206.

The controller 204 may receive signals from one or more sensors $S_{TB}$, $S_{VB}$, $S_{IB}$, $S_{TC}$, $S_{VC}$, $S_{IC}$, $S_{TM}$, $S_{VM}$, $S_{IM}$, $S_{RM}$. The controller may use the sensed information in controlling the temperature adjusting devices 200, for example starting heat transfer, stopping heat transfer, increasing a rate of heat transfer or even changing a direction of heat transfer. Such may be accomplished by application of control signals $C_{S1}$-$C_{S3}$ to select switches $SW_1$-$SW_3$. For example, control signals $C_{S1}$-$C_{S3}$ to switches $SW_1$-$SW_3$ may cause power (e.g., direct current) to be supplied to selected ones of the temperature adjustment devices 200, and set a voltage level of the applied power and even a polarity of the applied powere.

A battery temperature sensor $S_{TB}$ may be positioned to sense a temperature of the main electrical power storage device 118, or the ambient environment proximate the main electrical power storage device 118, and provide signals $T_B$ indicative of the sensed temperature.

A battery voltage sensor $S_{VB}$ may be positioned to sense a voltage across the main electrical power storage device 118 and provide signals $V_B$ indicative of the sensed voltage.

A battery charge sensor $S_{IB}$ may be positioned to sense a charge of the main electrical power storage device 118 and provide signals $I_B$ indicative of the sensed charge.

A power converter temperature sensor $S_{TC}$ may be positioned to sense a temperature of one or more of the power converters 206, or the ambient environment proximate the power converter(s) 206, and provide signals $T_C$ indicative of the sensed temperature.

A power converter voltage sensor $S_{VC}$ may be positioned to sense a voltage across one or more of the power converters 206 and provide signals $V_C$ indicative of the sensed voltage.

A power converter charge sensor $S_{IC}$ may be positioned to sense a charge through one or more of the power converters 206 and provide signals $I_C$ indicative of the sensed charge.

A traction motor temperature sensor $S_{TM}$ may be positioned to sense a temperature of the traction electric motor 116, or the ambient environment proximate the traction electric motor 116, and provide signals $T_M$ indicative of the sensed temperature.

A traction motor voltage sensor $S_{VM}$ may be positioned to sense a voltage across the main electrical power storage device 116 and provide signals $V_M$ indicative of the sensed voltage.

A traction motor current sensor $S_{IM}$ may be positioned to sense a current flow through the traction motor 116 and provide signals $I_M$ indicative of the sensed current.

A traction motor rotational sensor $S_{RM}$ may be positioned to sense a current flow through the traction motor 116 and provide signals RPM indicative of the sensed rotational speed.

As discussed herein, the controller can use one or more of the sensed conditions to control operation of one or more of the temperature adjusting devices 200.

Figure 3:
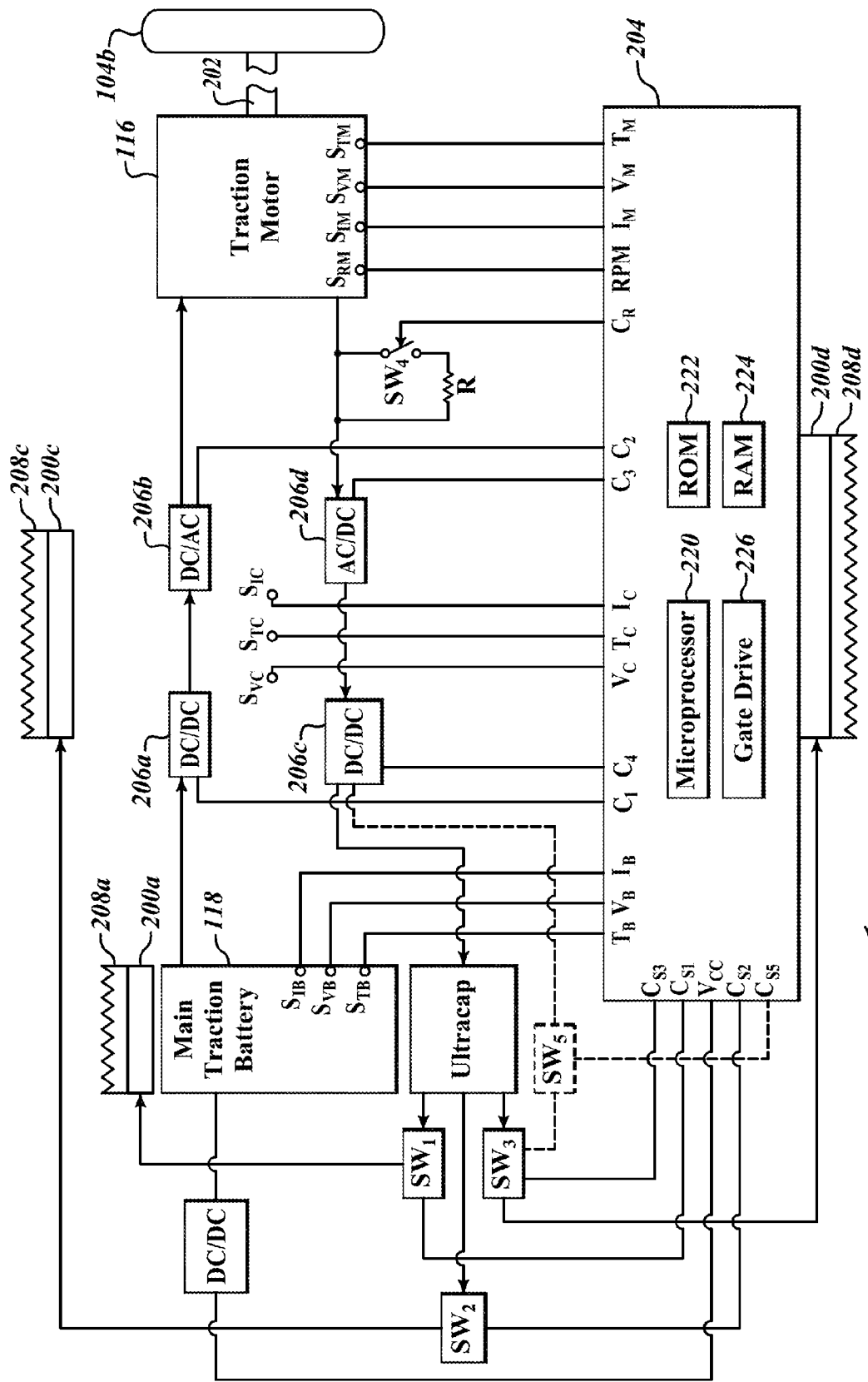
FIG. 3 is a block diagram of some of the components or structures of the scooter or motorbike of FIG. 1, according to another non-limiting illustrated embodiment.

FIG. 3 shows portions of the electric scooter or motorbike 100, according to another illustrated embodiment. In particular, FIG. 2 shows an embodiment which employs an auxiliary electrical energy storage device 300 to supply power generated by the traction electric motor 116 to be used for adjusting or controlling temperature of various components (e.g., electrical energy storage device 118 and/or circuitry) via a number of temperature adjustment devices 200. The auxiliary electrical energy storage device 300, is in addition to the main electrical energy storage device 118 which is still used to supply power to the traction electric motor 116. Many of the structures and/or components are similar, or even identical, to those illustrated and described with reference to FIG. 2, above. Such structures and components will share the same reference numbers as used in FIG. 2, and will not be described in further detail. Only some of the significant differences are described immediately below.

As noted, the embodiment of FIG. 3 adds an auxiliary electrical energy storage device 300. Electrical power generated by the traction electrical motor operating in regenerative braking mode is supplied to the auxiliary electrical energy storage device 300, for example via the AC/DC converter 206c and/or DC/DC converter 206d. The auxiliary electrical energy storage device 300 is illustrated as one or more super- or ultracapacitors, although such can take a variety of forms, for example a chemical battery. Since the auxiliary electrical energy storage device 300 does not drive the traction electric motor 116, greater flexibility is allowed in selecting the form. Thus, the auxiliary electrical energy storage device 300 may be selected based on a desired characteristic, such as performance at the expected voltages, charge capacity, and/or temperatures at which the auxiliary electrical energy storage device 300 will operate. The choice of an ultracapacitor may realize efficiencies over a chemical battery, particularly with respect to discharging and/or charging operations at relatively high ambient temperatures The switches $SW_1$-$SW_3$ are now operable to selectively couple the auxiliary electrical energy storage device 300 to the temperature adjustment devices 200. Switches $SW_1$-$SW_3$ may include for example one or more power-switching transistors or transistor arrays, for example one or more MOSFETs, IGBTs, or the like. In at least some instances, the controller 204 can modulate the operation of switches $SW_1$-$SW_3$, for example through the use of PWM driving signals to provide a distribution of power from the traction motor 116 and the auxiliary electrical energy storage device 300.

The embodiment of FIG. 3 may also include a dump or dissipation resistor R and a switch $SW_4$, which can for example include one or more power-switching transistors or transistor arrays, for example one or more MOSFETs, IGBTs, or the like operable in response to the receipt of one or more control signals $C_R$ from the controller 120 to selectively couple the resistor R in parallel between the traction electric motor 116 and the AC/DC power converter 206c. In at least some instances, the control signal provided by the controller 204 to $SW_4$ may be a PWM or similar control signal that can be modulated in conjunction with $SW_1$-$SW_3$ to alternate or apportion current flow between the auxiliary electrical energy storage device 300 and the resistor R. Such an arrangement may advantageously reduce the draw-down of the auxiliary electrical energy storage device 300 when the various temperature adjustment devices 200 are operated by selectively allowing current to flow from the traction motor 116 to the auxiliary electrical energy storage device 300 as some or all of the various temperature adjustment devices 200 are operated. For example, the controller 204 may provide a low duty cycle control signal to $SW_4$, effectively holding $SW_4$ open more than closed, during braking cycles when the various temperature adjustment devices 200 are operating or when the storage device 300 is at less than 100% charge. Conversely, the controller 204 may provide a higher duty cycle control signal to $SW_4$, effectively holding $SW_4$ closed more than open, during braking cycles when few or no temperature adjustment devices 200 are operating or when the storage device 300 is at full or near full charge. Such may allow excess electrical energy to be dissipated as heat, for example where the energy generated during regenerative braking operation is too much for the auxiliary electrical energy storage device 300.

The embodiment of FIG. 3 may additionally, or alternatively, include a direct coupling switch $SW_5$ which is operable in response to control signals $C_{S5}$ from the controller 120 to provide a direct electrical coupling between the electrical power generated by the traction electric motor operating in regenerative braking mode and the temperature adjusting devices 200 without any intervening batteries or ultracapacitors. The direct coupling switch $SW_5$ may include for example one or more power-switching transistors or transistor arrays, for example one or more MOSFETs, IGBTs, or the like. In at least some instances, the control signals provided by the controller 204 to $SW_5$ may be a PWM or similar control signals that permit the modulation of $SW_1$-$SW_4$ to alternate or apportion current flow provided during braking cycles between the auxiliary electrical energy storage device 300, the resistor R, and the various temperature adjustment devices 200.

Figure 4:
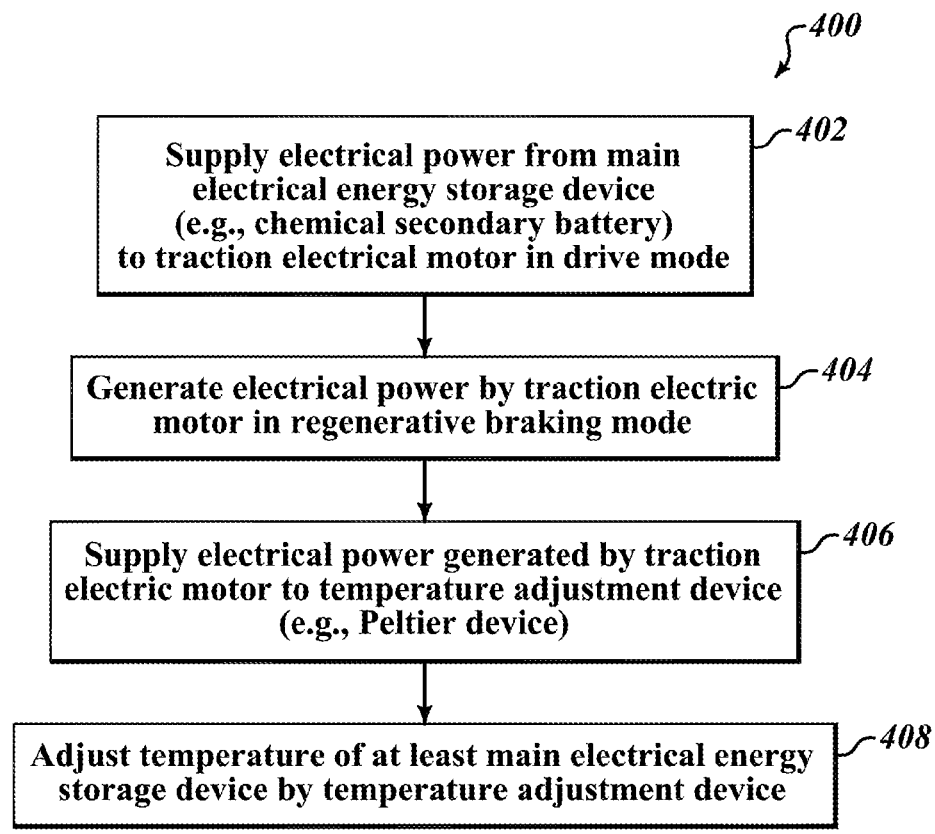
FIG. 4 is a flow diagram showing a high level method of operating the components or structures of FIGS. 2 and 3 to implement thermal management, according to one non-limiting illustrated embodiment.

FIG. 4 shows a high level method 400 of operating the components or structures of FIGS. 2 and 3 to implement thermal management, according to one non-limiting illustrated embodiment.

At 402, a power system supplies electrical power from a main electrical energy storage device (e.g., main chemical secondary battery) to a traction electrical motor operating in a drive mode. Such causes the traction electric motor to drive the wheel(s) of the vehicle.

At 404, the traction electric motor generates electrical power, operating in a regenerative braking mode. Such slows the vehicle without necessarily requiring dynamic brakes.

At 406, the power system supplies electrical power generated by traction electric motor to one or more temperature adjustment devices (e.g., Peltier devices). Such may be supplied as a DC voltage, the magnitude affecting a rate of thermal transfer, and a polarity affecting a direction of thermal transfer. As described above, the temperature adjustment devices may be located or positioned to control or adjust the temperature of one or more components, for example the main electrical energy storage device, power converters and/or controller.

At 408, in response to application of power, the one or more temperature adjustment devices adjust a temperature of at least the main electrical energy storage device. For example, the one or more temperature adjustment devices may transfer heat away from the main electrical energy storage device, to cool the main electrical energy storage device.

Figure 5:
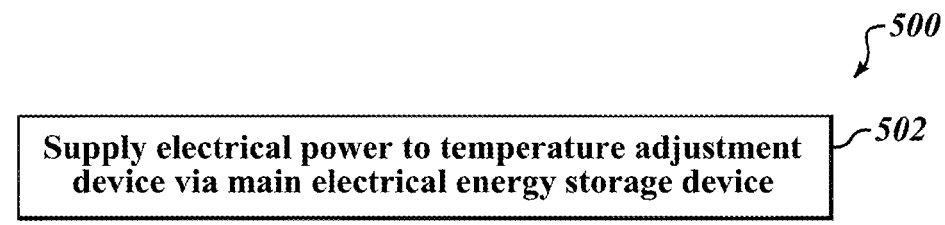
FIG. 5 is a flow diagram showing a low level method of operating the components or structures of FIGS. 2 and 3 to implement thermal management according to one non-limiting illustrated embodiment, including supplying power to a temperature adjustment device from a main electrical energy storage device, useful in performing the method of FIG. 4.

FIG. 5 shows a low level method 500 of operating the components or structures of FIGS. 2 and 3 to implement thermal management according to one non-limiting illustrated embodiment, including supplying power to a temperature adjustment device from a main electrical energy storage device, useful in performing the method 400 (FIG. 4).

At 502, the power system supplies electrical power generated by the traction electric motor to the temperature adjustment device(s) via the main electrical energy storage device. Thus, the electrical power generated by the traction electric motor may pass through, or even be temporarily stored by, the main electrical energy storage device.

Figure 6:
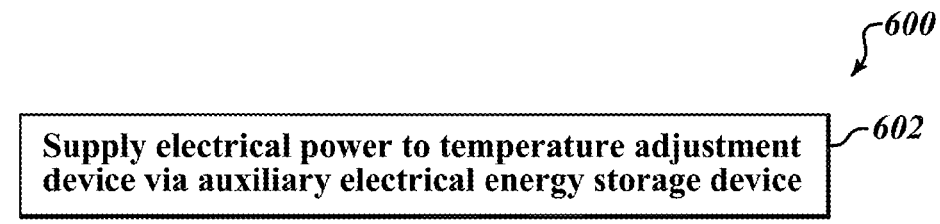
FIG. 6 is a flow diagram showing a low level method of operating the components or structures of FIGS. 2 and 3 to implement thermal management according to one non-limiting illustrated embodiment, including supplying power to a temperature adjustment device from an auxiliary electrical energy storage device, useful in performing the method of FIG. 4.

FIG. 6 shows a low level method 600 of operating the components or structures of FIGS. 2 and 3 to implement thermal management according to one non-limiting illustrated embodiment, including supplying power to a temperature adjustment device from an auxiliary electrical energy storage device, useful in performing the method 400 (FIG. 4).

At 602, the power system supplies the electrical power generated by the traction electric motor to the temperature adjustment device(s) via an auxiliary electrical energy storage device, different from the main electrical energy storage device. Thus, the electrical power generated by the traction electric motor may pass through, or even be temporarily stored by the auxiliary electrical energy storage device. Such may increase flexibility in selecting the power storage device, leading to unexpected benefits.

FIG. 7 shows a low level method 700 of operating the components or structures of FIGS. 2 and 3 to implement thermal management according to one non-limiting illustrated embodiment, including supplying power to a temperature adjustment device directly from a traction electric motor without the use of intervening electrical energy storage devices, useful in performing the method 400 (FIG. 4).

At 702, the power system supplies the electrical power generated by the traction electric motor to the temperature adjustment device(s) directly without any intermediary electrical energy storage devices (i.e., batteries, ultracapacitors). In such usage, the term electrical energy storage devices explicitly do not include inductors or standard capacitors which might otherwise store power.

FIG. 8 shows a low level method 800 of operating the components or structures of FIGS. 2 and 3 to implement thermal management according to one non-limiting illustrated embodiment, including receiving signals indicative of operational characteristics of the main electrical energy storage device and controlling a temperature adjustment device based at least in part on the received signals, useful in performing the method 400 (FIG. 4).

At 802, the controller receives signals indicative of temperature from one or more temperature sensor(s) positioned to sense a temperature at least proximate a main electrical energy storage device.

Alternatively or additionally, at 804 the controller receives signals indicative of one or more sensed electrical characteristic(s) (e.g., voltage, current) of the main electrical energy storage device from one or more voltage or current sensor(s) coupled to sense electrical characteristic(s) of the main electrical energy storage device. The sensed electrical characteristics may be indicative of temperature. Additionally, or alternatively, the sensed electrical characteristics may be indicative of a desired temperature at which a discharging or charging operation may be more efficiently performed than at a current temperature.

At 806, the controller determines a level of electrical power to deliver to one or more of the temperature adjustment device based at least in part on sensed temperature(s) and/or sensed electrical characteristic(s) of the main electrical energy storage device. For example, a microcontroller may determine whether to turn ON or turn OFF one or more temperature adjustment devices. Also for example, the microcontroller may determine a rate at which the one or more temperature adjustment devices should be operated to achieve the desired temperature adjustment (e.g., increase or heating, decrease or cooling). Also for example, the microcontroller may determine a direction of heat transfer (e.g., toward the component for heating, away from the component for cooling). The controller may then apply appropriate control signals to one or more switches which control or regulate a supply of power (i.e., current, voltage) to the temperature adjustment devices to achieve the desired temperature adjustment, for example cooling or heating of the main electrical energy storage device.

Figure 9:
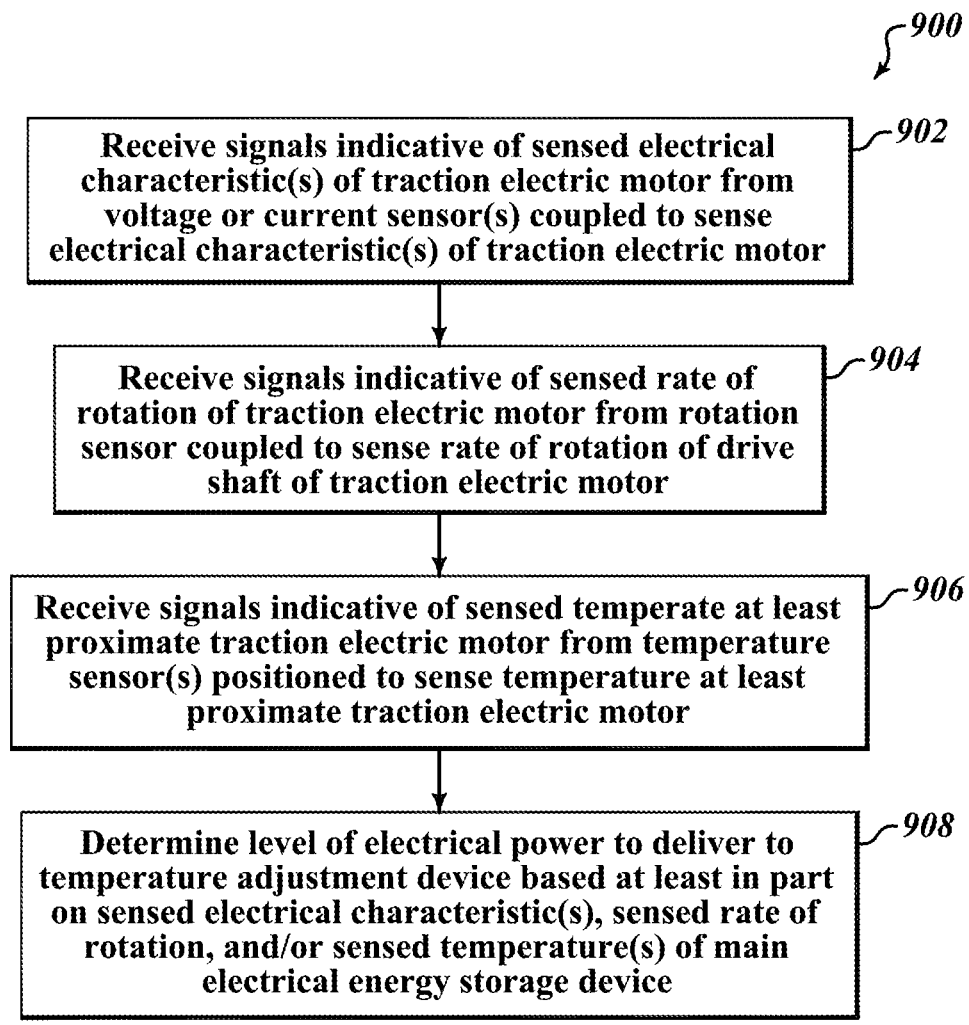
FIG. 9 is a flow diagram showing a low level method of operating the components or structures of FIGS. 2 and 3 to implement thermal management according to one non-limiting illustrated embodiment, including receiving signals indicative of operational characteristics of the traction electrical motor and controlling a temperature adjustment device based at least in part of the received signals, useful in performing the method of FIG. 4.

FIG. 9 shows a low level method 900 of operating the components or structures of FIGS. 2 and 3 to implement thermal management according to one non-limiting illustrated embodiment, including receiving signals indicative of operational characteristics of the traction electrical motor and controlling a temperature adjustment device based at least in part of the received signals, useful in performing the method 400 (FIG. 4).

At 902, a controller receives signals indicative of one or more sensed electrical characteristic(s) (e.g., voltage, current) of a traction electric motor from one or more voltage or current sensor(s) coupled to sense electrical characteristic(s) of traction electric motor. The sensed electrical characteristics may be indicative of temperature of one or more components supplying the power to the traction electric motor. Additionally, or alternatively, the sensed electrical characteristics may be indicative of a desired temperature at which a discharging or charging operation may be more efficiently performed than at a current temperature.

Additionally, or alternatively, at 904 the controller receives signals indicative of a sensed rate of rotation of the traction electric motor from one or more rotation sensors coupled to sense a rate of rotation of a drive shaft of the traction electric motor. The rotational speed may be indicative of a temperature of one or more components supplying the power to the traction electric motor.

Additionally, or alternatively, the sensed electrical characteristics may be indicative of a desired temperature at which a discharging or charging operation may be more efficiently performed than at a current temperature.

Additionally, or alternatively, at 906 the controller receives signals indicative of one or more temperatures sensed at least proximate the traction electric motor from one or more temperature sensor(s) positioned to sense temperature at least proximate the traction electric motor.

At 908, the controller determines a level of electrical power to deliver to one or more temperature adjustment devices based at least in part on the one or more sensed electrical characteristic(s), sensed rate of rotation, and/or sensed temperature(s) of the traction electric motor. For example, a microcontroller may determine whether to turn ON one or more temperature adjustment devices or to turn OFF one or more of the temperature adjustment devices. Also for example, the microcontroller may determine a rate at which the one or more temperature adjustment devices should be operated to achieve the desired temperature adjustment (e.g., increase or heating, decrease or cooling). Also for example, the microcontroller may determine a direction of heat transfer (e.g., toward the component for heating, away from the component for cooling). The controller may then apply appropriate control signals to one or more switches which control or regulate a supply of power (i.e., voltage, current) to the temperature adjustment devices to achieve the desired temperature adjustment.

It is noted that operation of the traction electric motor may be a good proxy for the operation of the main electrical energy storage device since such supplies electrical power to drive the traction electric motor or stores electrical power when produced by the traction election motor. Thus, the controller may use signals indicative of the operation of the traction electric motor to determine how to adjust the temperature of the main electrical energy storage device. It is also noted that operation of the traction electric motor may also be a good proxy for the operation of the power converters, again since power supplied either to, or from, the traction electric motor flows through the power converters. Thus, the controller may use signals indicative of the operation of the traction electric motor to determine how to adjust the temperature of one or more power converters.

Figure 10:
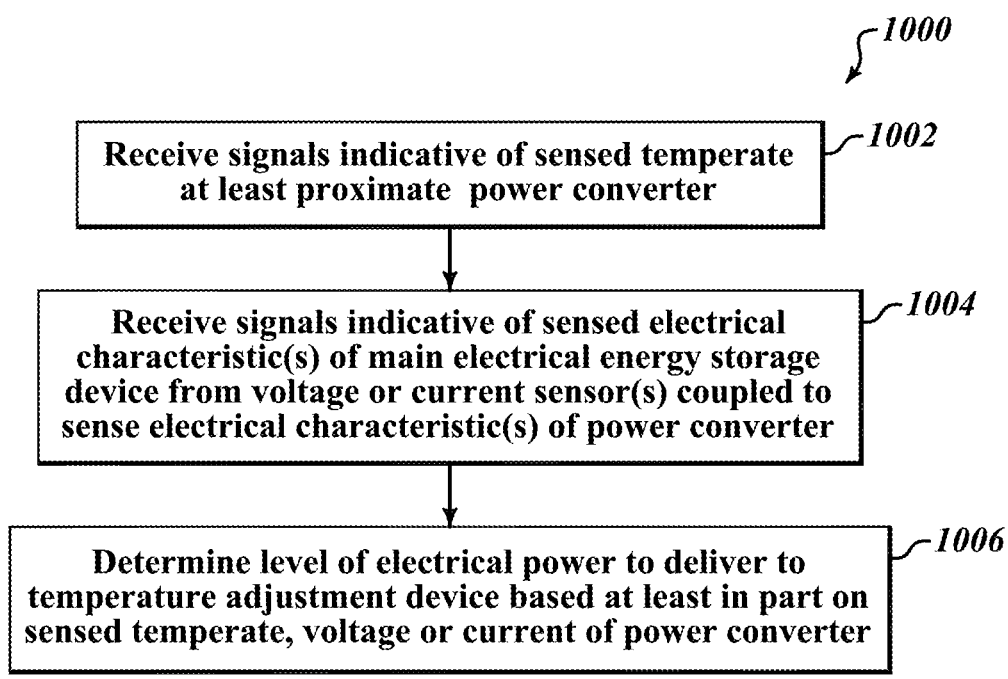
FIG. 10 is a flow diagram showing a low level method of operating the components or structures of FIGS. 2 and 3 to implement thermal management according to one non-limiting illustrated embodiment, including receiving signals indicative of operational characteristics of power and/or control circuitry and controlling a temperature adjustment device based at least in part of the received signals, useful in performing the method of FIG. 4.

FIG. 10 shows a low level method 1000 of operating the components or structures of FIGS. 2 and 3 to implement thermal management according to one non-limiting illustrated embodiment, including receiving signals indicative of operational characteristics of power and/or control circuitry and controlling a temperature adjustment device based at least in part of the received signals, useful in performing the method 400 (FIG. 4).

At 1002, a controller receives signals indicative of a sensed temperature at least proximate one or more power converters.

Additionally, or alternatively, at 1004 the controller receives signals indicative of one or more sensed electrical characteristic(s) of one or more power converters from one or more voltage or current sensor(s) coupled to sense electrical characteristic(s) of the power converter(s). The sensed electrical characteristics may be indicative of a temperature of one or more components supplying the power to the traction electric motor. Additionally, or alternatively, the sensed electrical characteristics may be indicative of a desired temperature at which a discharging or charging operation may be more efficiently performed than at a current temperature.

At 1006, the controller determines a level of electrical power to deliver to one or more temperature adjustment devices based at least in part on sensed temperature proximate one or more power converters and/or the sensed electrical characteristic of one or more power converters.

For example, a microcontroller may determine whether to turn ON or turn OFF one or more temperature adjustment devices. Also for example, the microcontroller may determine a rate at which the one or more temperature adjustment devices should be operated to achieve the desired temperature adjustment (e.g., increase or heating, decrease or cooling). Also for example, the microcontroller may determine a direction of heat transfer (e.g., toward the component for heating, away from the component for cooling). The controller may then apply appropriate control signals to switches which control or regulate the supply of power to the temperature adjustment devices to achieve the desired temperature adjustment, for example cooling one or more of the power converters.

It is noted that the operational characteristics of the power converters may be a good proxy for the operation of the main electrical energy storage device. Hence, cooling and/or heating of the main electrical energy storage device may be based on the operational characteristics of one or more of the power converters.

The various methods described herein may include additional acts, omit some acts, and/or may perform the acts in a different order than set out in the various flow diagrams.

The foregoing detailed description has set forth various embodiments of the devices and/or processes via the use of block diagrams, schematics, and examples. Insofar as such block diagrams, schematics, and examples contain one or more functions and/or operations, it will be understood by those skilled in the art that each function and/or operation within such block diagrams, flowcharts, or examples can be implemented, individually and/or collectively, by a wide range of hardware, software, firmware, or virtually any combination thereof. In one embodiment, the present subject matter may be implemented via one or more microcontrollers. However, those skilled in the art will recognize that the embodiments disclosed herein, in whole or in part, can be equivalently implemented in standard integrated circuits (e.g., Application Specific Integrated Circuits or ASICs), as one or more computer programs executed by one or more computers (e.g., as one or more programs running on one or more computer systems), as one or more programs executed by on one or more controllers (e.g., microcontrollers) as one or more programs executed by one or more processors (e.g., microprocessors), as firmware, or as virtually any combination thereof, and that designing the circuitry and/or writing the code for the software and/or firmware would be well within the skill of one of ordinary skill in the art in light of the teachings of this disclosure.

When logic is implemented as software and stored in memory, logic or information can be stored on any non-transitory computer-readable medium for use by or in connection with any processor-related system or method. In the context of this disclosure, a memory is a nontransitory computer- or processor-readable storage medium that is an electronic, magnetic, optical, or other physical device or means that non-transitorily contains or stores a computer and/or processor program. Logic and/or the information can be embodied in any computer-readable medium for use by or in connection with an instruction execution system, apparatus, or device, such as a computer-based system, processor-containing system, or other system that can fetch the instructions from the instruction execution system, apparatus, or device and execute the instructions associated with logic and/or information.

In the context of this specification, a "computer-readable medium" can be any physical element that can store the program associated with logic and/or information for use by or in connection with the instruction execution system, apparatus, and/or device. The computer-readable medium can be, for example, but is not limited to, an electronic, magnetic, optical, electromagnetic, infrared, or semiconductor system, apparatus or device. More specific examples (a non-exhaustive list) of the computer readable medium would include the following: a portable computer diskette (magnetic, compact flash card, secure digital, or the like), a random access memory (RAM), a read-only memory (ROM), an erasable programmable read-only memory (EPROM, EEPROM, or Flash memory), a portable compact disc read-only memory (CDROM), and digital tape.

The various embodiments described above can be combined to provide further embodiments. To the extent that they are not inconsistent with the specific teachings and definitions herein, all of the U.S. patents, U.S. patent application publications, U.S. patent applications, foreign patents, foreign patent applications and non-patent publications referred to in this specification and/or listed in the Application Data Sheet, including but not limited to: U.S. provisional patent application Ser. No. 61/511,900 entitled "APPARATUS, METHOD AND ARTICLE FOR COLLECTION, CHARGING AND DISTRIBUTING POWER STORAGE DEVICES, SUCH AS BATTERIES" and filed Jul. 26, 2011, U.S. provisional patent application Ser. No. 61/647,936 entitled "APPARATUS, METHOD AND ARTICLE FOR COLLECTION, CHARGING AND DISTRIBUTING POWER STORAGE DEVICES, SUCH AS BATTERIES" and filed May 16, 2012, U.S. provisional patent application Ser. No. 61/534,753 entitled "APPARATUS, METHOD AND ARTICLE FOR REDISTRIBUTING POWER STORAGE DEVICES, SUCH AS BATTERIES, BETWEEN COLLECTION, CHARGING AND DISTRIBUTION MACHINES" and filed Sep. 14, 2011, U.S. provisional patent application Ser. No. 61/534,761 entitled "APPARATUS, METHOD AND ARTICLE FOR AUTHENTICATION, SECURITY AND CONTROL OF POWER STORAGE DEVICES SUCH AS BATTERIES" and filed Sep. 14, 2011, U.S. provisional patent application Ser. No. 61/534,772 entitled "APPARATUS, METHOD AND ARTICLE FOR AUTHENTICATION, SECURITY AND CONTROL OF POWER STORAGE DEVICES, SUCH AS BATTERIES, BASED ON USER PROFILES" and filed Sep. 14, 2011, U.S. provisional patent application Ser. No. 61/511,887 entitled "THERMAL MANAGEMENT OF COMPONENTS IN ELECTRIC MOTOR DRIVE VEHICLES" and filed Jul. 26, 2011, U.S. provisional patent application Ser. No. 61/647,941 entitled "THERMAL MANAGEMENT OF COMPONENTS IN ELECTRIC MOTOR DRIVE VEHICLES" and filed May 16, 2012, U.S. provisional patent application Ser. No. 61/511,880 entitled "DYNAMICALLY LIMITING VEHICLE OPERATION FOR BEST EFFORT ECONOMY" and filed Jul. 26, 2011, U.S. provisional patent application Ser. No. 61/557,170 entitled "APPARATUS, METHOD, AND ARTICLE FOR PHYSICAL SECURITY OF POWER STORAGE DEVICES IN VEHICLES" and filed Nov. 8, 2011, U.S. provisional patent application Ser. No. 61/581,566 entitled APPARATUS, METHOD AND ARTICLE FOR A POWER STORAGE DEVICE COMPARTMENT' and filed Dec. 29, 2011, U.S. provisional patent application Ser. No. 61/601,404 entitled "APPARATUS, METHOD AND ARTICLE FOR PROVIDING VEHICLE DIAGNOSTIC DATA" and filed Feb. 21, 2012, U.S. provisional patent application Ser. No. 61/601,949 entitled "APPARATUS, METHOD AND ARTICLE FOR PROVIDING LOCATIONS OF POWER STORAGE DEVICE COLLECTION, CHARGING AND DISTRIBUTION MACHINES" and filed Feb. 22, 2012, and U.S. provisional patent application Ser. No. 61/601,953 entitled "APPARATUS, METHOD AND ARTICLE FOR PROVIDING INFORMATION REGARDING AVAILABILITY OF POWER STORAGE DEVICES AT A POWER STORAGE DEVICE COLLECTION, CHARGING AND DISTRIBUTION MACHINE" and filed Feb. 22, 2012, U.S. application Ser. No. 61/601,953 filed on Jul. 26, 2012, naming Hok-Sum Horace Luke, Matthew Whiting Taylor and Huang-Cheng Hung as inventors and entitled "APPARATUS, METHOD AND ARTICLE FOR COLLECTION, CHARGING AND DISTRIBUTING POWER STORAGE DEVICES, SUCH AS BATTERIES", U.S. application Ser. No. 13/559314 filed on Jul. 26, 2012, naming Hok-Sum Horace Luke and Matthew Whiting Taylor as inventors and entitled "APPARATUS, METHOD AND ARTICLE FOR AUTHENTICATION, SECURITY AND CONTROL OF POWER STORAGE DEVICES SUCH AS BATTERIES" U.S. application Ser. No. 13/559,038 filed on Jul. 26, 2012 naming Hok-Sum Horace Luke and Matthew Whiting Taylor as inventors and entitled "DYNAMICALLY LIMITING VEHICLE OPERATION FOR BEST EFFORT ECONOMY", U.S. application Ser. No. 13/559,264 filed on Jul. 26, 2012, naming Matthew Whiting Taylor, Yi-Tsung Wu, Hok-Sum Horace Luke and Huang-Cheng Hung as inventors and entitled "APPARATUS, METHOD, AND ARTICLE FOR PHYSICAL SECURITY OF POWER STORAGE DEVICES IN VEHICLES", U.S. application Ser. No. 13/559,054 filed on Jul. 26, 2012, naming Ching Chen, Hok-Sum Horace Luke, Matthew Whiting Taylor, Yi-Tsung Wu as inventors and entitled "APPARATUS, METHOD AND ARTICLE FOR PROVIDING VEHICLE DIAGNOSTIC DATA", U.S. application Ser. No. 13/559,390 filed on Jul. 26, 2012, naming Yi-Tsung Wu, Matthew Whiting Taylor, Hok-Sum Horace Luke and Jung-Hsiu Chen as inventors and entitled "APPARATUS, METHOD AND ARTICLE FOR PROVIDING INFORMATION REGARDING AVAILABILITY OF POWER STORAGE DEVICES AT A POWER STORAGE DEVICE COLLECTION, CHARGING AND DISTRIBUTION MACHINE", and U.S. application Ser. No. 13/559,343 filed on Jul. 26, 2012, naming Hok-Sum Horace Luke, Yi-Tsung Wu, Jung-Hsiu Chen, Yulin Wu, Chien Ming Huang, TsungTing Chan, Shen-Chi Chen and Feng Kai Yang as inventors and entitled "APPARATUS, METHOD AND ARTICLE FOR RESERVING POWER STORAGE DEVICES AT RESERVING POWER STORAGE DEVICE COLLECTION, CHARGING AND DISTRIBUTION MACHINES" Ser. No. 13/559,064 are incorporated herein by reference, in their entirety. Aspects of the embodiments can be modified, if necessary, to employ systems, circuits and concepts of the various patents, applications and publications to provide yet further embodiments.

While generally discussed in the environment and context of power system for use with personal transportation vehicle such as all-electric scooters and/or motorbikes, the teachings herein can be applied in a wide variety of other environments, including other vehicular environments, as well as non-vehicular environments.

The above description of illustrated embodiments, including what is described in the Abstract, is not intended to be exhaustive or to limit the embodiments to the precise forms disclosed. Although specific embodiments and examples are described herein for illustrative purposes, various equivalent modifications can be made without departing from the spirit and scope of the disclosure, as will be recognized by those skilled in the relevant art.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

We claim:

1. A power system for a vehicle, the apparatus comprising:
a traction electric motor coupled to drive at least one traction wheel of the vehicle;
a main electrical energy storage device to drive the traction electric motor;
at least one temperature adjustment device positioned and operable to adjust a temperature at least proximate the main electrical energy storage device; and
a control circuit that determines a rate at which the temperature adjustment device should be operated and causes electrical power generated by the traction electric motor operated regeneratively in a braking mode to be supplied to the temperature adjustment device, the supplied electrical power causing the temperature adjustment device to operate at the determined rate to adjust a temperature of the main electrical energy storage device.

2. The power system of claim 1 wherein the control circuit further causes electrical power to be supplied to the traction electrical motor from the main electrical energy storage device in a drive mode.

3. The power system of claim 2 wherein the main electrical energy storage device includes at least one secondary chemical battery cell.

4. The power system of claim 1 wherein the at least one temperature adjustment device includes at least one Peltier effect device.

5. The power system of claim 1 wherein the control circuit causes electrical power generated by the traction electric motor to be supplied to the temperature adjustment device via the main electrical energy storage device.

6. The power system of claim 1, further comprising:
an auxiliary electrical energy storage device, wherein the control circuit causes electrical power generated by the traction electric motor to be supplied to the temperature adjustment device via the auxiliary electrical energy storage device.

7. The power system of claim 1 wherein the control circuit causes electrical power generated by the traction electric motor to be supplied directly to the temperature adjustment device without any intermediary electrical energy storage devices.

8. The power system of claim 1 wherein the control circuit includes at least one temperature sensor positioned to sense temperature at least proximate the main electrical energy storage device, and wherein the control circuit controls the electrical power supplied to the at least one temperature adjustment device based at least in part on the sensed temperature.

9. The power system of claim 1 wherein the control circuit includes at least one of a voltage sensor or a current sensor coupled to sense at least one electrical characteristic of the main electrical energy storage device, wherein the control circuit controls the electrical power supplied to the at least one temperature adjustment device based at least in part on the at least one sensed electrical characteristic of the main electrical energy storage device.

10. The power system of claim 1 wherein the control circuit includes at least one of a voltage sensor or a current sensor coupled to sense at least one electrical characteristic of the traction electric motor, wherein the control circuit controls the electrical power supplied to the at least one temperature adjustment device based at least in part on the at least one sensed electrical characteristic of the traction electric motor.

11. The power system of claim 1 wherein the control circuit includes a rotation sensor coupled to sense a rate of rotation of a drive shaft of the traction electric motor, wherein the control circuit controls the electrical power supplied to the at least one temperature adjustment device based at least in part on the sensed rate of rotation of the traction electric motor.

12. The power system of claim 1 wherein the control circuit includes a temperature sensor positioned to sense a temperature at least proximate the traction electric motor, wherein the control circuit controls the electrical power supplied to the at least one temperature adjustment device based at least in part on the sensed temperature at least proximate the traction electric motor.

13. The power system of claim 1 wherein the control circuit includes a rectifier coupled to rectify an alternating current (AC) produced by the fraction electric motor when operating in the braking mode into a direct current (DC).

14. The power system of claim 13 wherein the control circuit includes at least one DC/DC converter electrically coupled to the at least one temperature adjustment device and operable to change a voltage level of electrical power transferred between the at least one temperature adjustment device and at least one other component of the power system.

15. The power system of claim 14 wherein the control circuit includes at least one temperature sensor positioned to sense a temperature at least proximate at least one of the rectifier or the DC/DC converter, wherein the control circuit controls the electrical power supplied to the at least one temperature adjustment device based at least in part on the sensed temperate at least proximate at least one of the rectifier or the DC/DC converter.

16. The power system of claim 1 wherein a first one of the at least one temperature adjustment devices is positioned and operable to adjust a temperature at least proximate one of the rectifier, the DC/DC converter, or the control circuit.

17. The power system of claim 1, further comprising:
a thermal dissipation resistor selectively electrically coupled to dissipate as heat, electrical energy generated by the traction electric motor in response to the generated electrical energy approaching a rated power of the at least one temperature adjustment device.

18. A method of operating a power system for a vehicle having a traction electric motor, the method comprising:
supplying electrical power from a main electrical energy storage device to the traction electrical motor of the vehicle in a drive mode;
generating electrical power by the traction electric motor that operates regeneratively in a braking mode;
determining a rate at which a temperature adjustment device shout be operated;
causing the temperature adjustment device to operate at the determined rate by supplying electrical power generated by the traction electric motor to the temperature adjustment device; and
adjusting a temperature of at least the main electrical energy storage device by the temperature adjustment device in response to the supply of power thereto.

19. The method of claim 18 wherein supplying electrical power from a main electrical energy storage device to the traction electrical motor includes supplying electrical power from at least one secondary chemical battery cell.

20. The method of claim 18 wherein supplying electrical power generated by the traction electric motor to a temperature adjustment device includes supplying electrical power to at least one Peltier effect device.

21. The method of claim 18 wherein supplying electrical power generated by the traction electric motor to a temperature adjustment device includes supplying the electrical power via the main electrical energy storage device.

22. The method of claim 18 wherein supplying electrical power generated by the traction electric motor to a temperature adjustment device includes supplying the electrical power via an auxiliary electrical energy storage device, different from the main electrical energy storage device which supplies power to the traction electric motor.

23. The method of claim 18 wherein supplying electrical power generated by the traction electric motor to a temperature adjustment device includes supplying the electrical power directly to the temperature adjustment device without any intermediary electrical energy storage devices.

24. The method of claim 18, further comprising:
receiving signals indicative of sensed temperature from at least one temperature sensor positioned to sense temperature at least proximate the main electrical energy storage device, and wherein the supplying electrical power to the at least one temperature adjustment device is based at least in part on the sensed temperature.

25. The method of claim 18, further comprising:
receiving signals indicative of at least one sensed electrical characteristic of the main electrical energy storage device from at least one of a voltage sensor or a current sensor coupled to sense at least one electrical characteristic of the main electrical energy storage device, and wherein supplying electrical power to the at least one temperature adjustment device is based at least in part on the at least one sensed electrical characteristic of the main electrical energy storage device.

26. The method of claim 18, further comprising:
receiving signals indicative of at least one sensed electrical characteristic of the traction electric motor from at least one of a voltage sensor or a current sensor coupled to sense at least one electrical characteristic of the traction electric motor, and wherein supplying electrical power to the at least one temperature adjustment device is based at least in part on the at least one sensed electrical characteristic of the traction electric motor.

27. The method of claim 18, further comprising:
receiving signals indicative of a sensed rate of rotation of the traction electric motor from a rotation sensor coupled to sense a rate of rotation of a drive shaft of the traction electric motor, and wherein supplying electrical power to the at least one temperature adjustment device is based at least in part on the sensed rate of rotation of the traction electric motor.

28. The method of claim 18, further comprising:
receiving signals indicative of a sensed temperate at least proximate the traction electric motor from a temperature sensor positioned to sense a temperature at least proximate the traction electric motor, and wherein supplying electrical power to the at least one temperature adjustment device is based at least in part on the sensed temperate at least proximate the traction electric motor.

29. The method of claim 18, further comprising:
receiving signals indicative of a sensed temperature at least proximate a power converter, and wherein supplying electrical power to the at least one temperature adjustment device is based at least in part on the sensed temperature at least proximate the power converter to cool the power converter.

30. The method of claim 18, wherein causing the temperature adjustment device to operate at the determined rate by supplying electrical power generated by the traction electric motor to the temperature adjustment device comprises regulating the supply of electrical power to the temperature adjustment device.

* * * * *

UNITED STATES PATENT AND TRADEMARK OFFICE
CERTIFICATE OF CORRECTION

| | |
|---|---|
| PATENT NO. | : 8,901,861 B2 |
| APPLICATION NO. | : 13/559259 |
| DATED | : December 2, 2014 |
| INVENTOR(S) | : Hok-Sum Horace Luke et al. |

Page 1 of 1

It is certified that error appears in the above-identified patent and that said Letters Patent is hereby corrected as shown below:

In the claims

Column 22, Line 60:
"device shout be operated;" should read, --device should be operated;--

Signed and Sealed this
Fourteenth Day of June, 2016

Michelle K. Lee
*Director of the United States Patent and Trademark Office*

UNITED STATES PATENT AND TRADEMARK OFFICE
CERTIFICATE OF CORRECTION

PATENT NO. : 8,901,861 B2  
APPLICATION NO. : 13/559259  
DATED : December 2, 2014  
INVENTOR(S) : Hok-Sum Horace Luke et al.

Page 1 of 1

It is certified that error appears in the above-identified patent and that said Letters Patent is hereby corrected as shown below:

In the claims

Column 21, line 14:
"1. A power system for a vehicle, the apparatus comprising:" should read, --1. A power system for a vehicle, the power system comprising:--.

Column 22, line 42:
"16. The power system of claim 1 wherein a first one of the" should read, --16. The power system of claim 14 wherein a first one of the--.

Signed and Sealed this
Second Day of August, 2016

Michelle K. Lee
*Director of the United States Patent and Trademark Office*